United States Patent
Kawashima

(10) Patent No.: US 10,513,246 B2
(45) Date of Patent: Dec. 24, 2019

(54) WINDSHIELD WIPER CONNECTOR

(71) Applicant: Pylon Manufacturing Corporation, Deerfield Beach, FL (US)

(72) Inventor: Hiroshi Kawashima, Sunrise, FL (US)

(73) Assignee: Pylon Manufacturing Corp., Deerfield Beach, FL (US)

( * ) Notice: Subject to any disclaimer, the term of this patent is extended or adjusted under 35 U.S.C. 154(b) by 277 days.

(21) Appl. No.: 15/600,288

(22) Filed: May 19, 2017

(65) Prior Publication Data

US 2017/0334404 A1 Nov. 23, 2017

Related U.S. Application Data

(60) Provisional application No. 62/339,072, filed on May 19, 2016.

(51) Int. Cl.
*B60S 1/40* (2006.01)
*B60S 1/38* (2006.01)

(52) U.S. Cl.
CPC ........... *B60S 1/4038* (2013.01); *B60S 1/3853* (2013.01); *B60S 1/4048* (2013.01); *B60S 1/4003* (2013.01); *B60S 2001/4054* (2013.01); *B60S 2001/4061* (2013.01)

(58) Field of Classification Search
CPC .... B60S 1/4003; B60S 1/4038; B60S 1/4045; B60S 1/4048; B60S 2001/4054; B60S 2001/4058; B60S 2001/4051; B60S 2001/4061; B60S 1/3853
USPC ....................................................... 15/250.32
See application file for complete search history.

(56) References Cited

U.S. PATENT DOCUMENTS

| D56,762 S | 12/1920 | Minier |
| 2,310,751 A | 2/1943 | Scinta |
| 2,550,094 A | 4/1951 | Smulski |
| 2,589,339 A | 3/1952 | Carson |
| 2,616,112 A | 11/1952 | Smulski |

(Continued)

FOREIGN PATENT DOCUMENTS

| BR | 102015007588 A2 | 4/2016 |
| DE | 10230457 A1 | 1/2004 |

(Continued)

OTHER PUBLICATIONS

Forch, R., et al., "Appendix C: Contact Angle Goniometry," Surface Design: Applications in Bioscience and Nanotechnology, pp. 471-473 (Sep. 9, 2009).

(Continued)

*Primary Examiner* — Gary K. Graham
(74) *Attorney, Agent, or Firm* — Cozen O'Connor

(57) ABSTRACT

A connector assembly and wiper blade incorporating same having a base connector, having two longitudinal side walls, a first and second end, and a top surface extending therebetween, wherein the top surface has a pair of cantilevered beams, each provided with a locking tab, extending from a central portion towards each respective end of the base connector. The locking tabs are capable of engaging and securing an aperture in cap or wiper arm. The base connector further has a central recessed portion capable of receiving and securing a top wall of a side adapter. The base connector may further include a base support structure capable of securing the base connector to a wiper blade.

19 Claims, 7 Drawing Sheets

(56) References Cited

U.S. PATENT DOCUMENTS

| | | |
|---|---|---|
| 2,643,411 A | 6/1953 | Nesson |
| 2,658,223 A | 11/1953 | Enochian |
| 2,799,887 A | 7/1957 | Nemic |
| 2,801,436 A | 8/1957 | Scinta |
| 2,814,820 A | 12/1957 | Elliot et al. |
| 2,890,472 A | 6/1959 | Olson |
| 2,932,843 A | 4/1960 | Zaiger et al. |
| 2,937,393 A | 5/1960 | Brueder |
| 2,946,078 A | 7/1960 | Deibel et al. |
| 3,029,460 A | 4/1962 | Hoyler |
| 3,037,233 A | 6/1962 | Peras et al. |
| 3,056,991 A | 10/1962 | Smithers |
| 3,082,464 A | 3/1963 | Smithers |
| 3,088,155 A | 5/1963 | Smithers |
| 3,089,174 A | 5/1963 | Bignon |
| 3,104,412 A | 9/1963 | Hinder |
| 3,116,510 A | 1/1964 | Oishei et al. |
| 3,132,367 A | 5/1964 | Wise |
| 3,139,644 A | 7/1964 | Smith |
| 3,147,506 A | 9/1964 | Williams |
| 3,147,507 A | 9/1964 | Glynn |
| 3,192,551 A | 7/1965 | Appel |
| 3,234,578 A | 2/1966 | Goulb et al. |
| 3,296,647 A | 1/1967 | Gumbleton |
| 3,317,945 A | 5/1967 | Ludwig |
| 3,317,946 A | 5/1967 | Anderson |
| 3,350,738 A | 11/1967 | Anderson |
| D211,570 S | 7/1968 | Tomlin |
| 3,405,421 A | 10/1968 | Tomlin |
| 3,418,679 A | 12/1968 | Barth et al. |
| 3,480,986 A | 12/1969 | Forster |
| 3,588,941 A | 6/1971 | Schlesinger |
| 3,588,942 A | 6/1971 | Schlesinger |
| 3,618,155 A | 11/1971 | Mower |
| 3,665,544 A | 5/1972 | Sakamoto |
| 3,673,631 A | 7/1972 | Yamadai et al. |
| 3,685,086 A | 8/1972 | Froehlich |
| 3,751,754 A | 8/1973 | Quinlan et al. |
| 3,757,377 A | 9/1973 | Hayhurst |
| 3,780,395 A | 12/1973 | Quinlan et al. |
| 3,857,741 A | 12/1974 | Hultgren et al. |
| 3,862,465 A | 1/1975 | Ito |
| 3,872,535 A | 3/1975 | Arman |
| 3,872,537 A | 3/1975 | Bianchi |
| 3,879,793 A | 4/1975 | Schlegel |
| 3,879,794 A | 4/1975 | Roberts, Jr. |
| 3,881,213 A | 5/1975 | Tilli |
| 3,881,214 A | 5/1975 | Palu |
| D236,337 S | 8/1975 | Deibel |
| 3,929,222 A | 12/1975 | Smith et al. |
| 3,942,212 A | 3/1976 | Steger et al. |
| 3,969,784 A | 7/1976 | Journee |
| D240,809 S | 8/1976 | Deibel |
| 3,995,347 A | 12/1976 | Kohler |
| 4,007,511 A | 2/1977 | Deibel |
| 4,009,504 A | 3/1977 | Arman |
| 4,028,770 A | 6/1977 | Appel |
| 4,047,480 A | 9/1977 | Vassiliou |
| 4,063,328 A | 12/1977 | Arman |
| D248,375 S | 7/1978 | Bergstein |
| D248,388 S | 7/1978 | Hughes |
| 4,102,003 A | 7/1978 | Hancu |
| 4,120,069 A | 10/1978 | Sharp et al. |
| 4,127,912 A | 12/1978 | Deibel et al. |
| 4,127,916 A | 12/1978 | van den Berg et al. |
| D253,040 S | 10/1979 | Fournier et al. |
| D253,167 S | 10/1979 | Fournier et al. |
| D257,339 S | 10/1980 | Ellinwood |
| 4,239,104 A | 12/1980 | Roccaforte et al. |
| 4,308,635 A | 1/1982 | Maiocco |
| 4,309,790 A | 1/1982 | Bauer et al. |
| 4,324,019 A | 4/1982 | Mohnach et al. |
| 4,327,458 A | 5/1982 | Maiocco |
| 4,334,001 A | 6/1982 | Horie et al. |
| 4,339,839 A | 7/1982 | Knights |
| 4,342,126 A | 8/1982 | Neefeldt |
| 4,343,063 A | 8/1982 | Batt |
| 4,343,064 A | 8/1982 | van den Berg et al. |
| 4,354,293 A | 10/1982 | Le Sausse et al. |
| D267,939 S | 2/1983 | Duvoux |
| D267,940 S | 2/1983 | Duvoux |
| D268,020 S | 2/1983 | Duvoux |
| 4,400,845 A | 8/1983 | Noguchi et al. |
| 4,416,032 A | 11/1983 | Mohnach et al. |
| 4,422,207 A | 12/1983 | Maiocco et al. |
| 4,438,543 A | 3/1984 | Noguchi et al. |
| 4,464,808 A | 8/1984 | Berry |
| 4,547,925 A | 10/1985 | Blackborow et al. |
| 4,561,143 A | 12/1985 | Beneteau |
| D282,243 S | 1/1986 | Mason |
| D282,718 S | 2/1986 | Fireman |
| 4,570,284 A | 2/1986 | Verton |
| 4,587,686 A | 5/1986 | Thompson |
| 4,590,638 A | 5/1986 | Beneteau |
| D286,499 S | 11/1986 | Moreno |
| D287,709 S | 1/1987 | Mower et al. |
| 4,649,591 A | 3/1987 | Guerard |
| 4,670,284 A | 6/1987 | Berkoff |
| 4,670,934 A | 6/1987 | Epple et al. |
| D295,020 S | 4/1988 | Franchi |
| 4,741,071 A | 5/1988 | Bauer et al. |
| D296,317 S | 6/1988 | Mower et al. |
| 4,760,934 A | 8/1988 | Netsch |
| 4,766,636 A | 8/1988 | Shinpo |
| D298,116 S | 10/1988 | Sussich |
| 4,782,547 A | 11/1988 | Mohnach |
| D298,926 S | 12/1988 | Rusnak |
| 4,795,288 A | 1/1989 | Sakai |
| 4,807,326 A | 2/1989 | Arai et al. |
| D301,329 S | 5/1989 | Cavicchioli |
| 4,852,206 A | 8/1989 | Fisher |
| D304,709 S | 11/1989 | Sussich |
| D307,408 S | 4/1990 | Mower et al. |
| D308,352 S | 6/1990 | Bradley |
| D308,660 S | 6/1990 | Fisher |
| D308,845 S | 6/1990 | Charet et al. |
| 4,930,180 A | 6/1990 | Longman |
| D310,193 S | 8/1990 | Charet et al. |
| 4,971,472 A | 11/1990 | Pethers |
| 4,976,001 A | 12/1990 | Wright |
| 4,984,325 A | 1/1991 | Arai et al. |
| 4,989,290 A | 2/1991 | Hoshino |
| 5,027,947 A | 7/1991 | Reighart |
| 5,042,106 A | 8/1991 | Maubray |
| 5,056,183 A | 10/1991 | Haney, III |
| 5,062,176 A | 11/1991 | Unterborn et al. |
| D322,053 S | 12/1991 | Bradley |
| D322,772 S | 12/1991 | Leu et al. |
| D322,952 S | 1/1992 | Wu |
| 5,082,078 A | 1/1992 | Umeda et al. |
| D323,637 S | 2/1992 | Dipple |
| D324,014 S | 2/1992 | Ruminer |
| 5,084,933 A | 2/1992 | Buechele |
| 5,086,534 A | 2/1992 | Journee |
| D324,359 S | 3/1992 | Chen |
| D324,667 S | 3/1992 | Williams |
| 5,093,954 A | 3/1992 | Kuzuno |
| D327,013 S | 6/1992 | Reighart |
| D327,461 S | 6/1992 | Nelson |
| 5,123,140 A | 6/1992 | Raymond |
| D327,667 S | 7/1992 | Mar |
| D328,061 S | 7/1992 | Su |
| 5,138,739 A | 8/1992 | Maubray |
| D329,034 S | 9/1992 | Charet et al. |
| D329,997 S | 10/1992 | Leu |
| D330,181 S | 10/1992 | Charet et al. |
| D330,691 S | 11/1992 | Leu |
| D330,696 S | 11/1992 | Alain |
| D331,036 S | 11/1992 | Isley |
| D331,037 S | 11/1992 | Hsi |
| D331,212 S | 11/1992 | Poteet |
| D331,556 S | 12/1992 | Ismert |
| 5,168,596 A | 12/1992 | Maubray |
| 5,170,527 A | 12/1992 | Lyon, II |

(56) References Cited

U.S. PATENT DOCUMENTS

| | | |
|---|---|---|
| D332,593 S | 1/1993 | Gerardiello et al. |
| 5,179,761 A | 1/1993 | Buechele et al. |
| 5,182,831 A | 2/1993 | Knight |
| D334,161 S | 3/1993 | Wu et al. |
| D334,549 S | 4/1993 | Esquibel |
| 5,206,969 A | 5/1993 | Patterson et al. |
| D336,739 S | 6/1993 | Wu et al. |
| 5,218,735 A | 6/1993 | Maubray |
| 5,228,167 A | 7/1993 | Yang |
| 5,233,721 A | 8/1993 | Yang |
| D341,561 S | 11/1993 | Heckman et al. |
| 5,257,436 A | 11/1993 | Yang |
| D342,225 S | 12/1993 | Heckman et al. |
| 5,276,937 A | 1/1994 | Lan |
| 5,283,925 A | 2/1994 | Maubray |
| D345,329 S | 3/1994 | Kanellis et al. |
| D345,330 S | 3/1994 | Yang |
| D345,537 S | 3/1994 | Bianco et al. |
| D345,538 S | 3/1994 | Bianco et al. |
| 5,289,608 A | 3/1994 | Kim |
| 5,307,536 A | 5/1994 | Lescher |
| 5,311,636 A | 5/1994 | Lee |
| 5,312,177 A | 5/1994 | Coulter |
| D347,610 S | 6/1994 | Charet et al. |
| 5,319,826 A | 6/1994 | Mower |
| 5,325,564 A | 7/1994 | Swanepoel |
| D349,877 S | 8/1994 | Oyama |
| 5,333,351 A | 8/1994 | Sato |
| D350,723 S | 9/1994 | Longazel |
| 5,349,716 A | 9/1994 | Millar |
| 5,361,896 A | 11/1994 | Yang |
| D353,354 S | 12/1994 | Oyama |
| 5,372,449 A | 12/1994 | Bauer et al. |
| 5,383,248 A | 1/1995 | Ho |
| 5,383,249 A | 1/1995 | Yang |
| 5,392,489 A | 2/1995 | Mohnach |
| D357,626 S | 4/1995 | Snow et al. |
| 5,408,719 A | 4/1995 | DeRees et al. |
| 5,412,177 A | 5/1995 | Clark |
| 5,435,041 A | 7/1995 | Ho |
| 5,454,135 A | 10/1995 | Okuya et al. |
| 5,459,900 A | 10/1995 | Mege et al. |
| 5,463,790 A | 11/1995 | Chiou et al. |
| D365,079 S | 12/1995 | Abbott et al. |
| 5,485,650 A | 1/1996 | Swanepoel |
| 5,487,205 A | 1/1996 | Scherch et al. |
| D367,839 S | 3/1996 | Abbott et al. |
| 5,497,528 A | 3/1996 | Wu |
| 5,509,166 A | 4/1996 | Wagner et al. |
| D370,199 S | 5/1996 | Kim |
| 5,519,913 A | 5/1996 | Schedule |
| D370,653 S | 6/1996 | Kim |
| D370,654 S | 6/1996 | Kim |
| D372,217 S | 7/1996 | Abbott et al. |
| 5,564,157 A | 10/1996 | Kushida et al. |
| 5,566,419 A | 10/1996 | Zhou |
| 5,568,670 A | 10/1996 | Samples et al. |
| D375,289 S | 11/1996 | Waselewski et al. |
| 5,577,292 A | 11/1996 | Blachetta et al. |
| D376,792 S | 12/1996 | Chodkiewicz |
| 5,593,125 A | 1/1997 | Storz et al. |
| D377,754 S | 2/1997 | Abbott et al. |
| 5,606,766 A | 3/1997 | Lee |
| 5,628,085 A | 5/1997 | Edele et al. |
| 5,633,932 A | 5/1997 | Davis et al. |
| D379,613 S | 6/1997 | Chen |
| 5,647,088 A | 7/1997 | Bommer et al. |
| D382,848 S | 8/1997 | Chen |
| 5,661,870 A | 9/1997 | Eustache et al. |
| 5,661,871 A | 9/1997 | Scorsiroli |
| D389,449 S | 1/1998 | Hussaini |
| D390,823 S | 2/1998 | Baranowski et al. |
| D392,612 S | 3/1998 | Jonasson et al. |
| 5,732,437 A | 3/1998 | Jonasson et al. |
| D393,619 S | 4/1998 | Jeffer et al. |
| 5,742,973 A | 4/1998 | Kessler |
| D395,271 S | 6/1998 | Kim |
| D395,864 S | 7/1998 | Stahlhut et al. |
| D395,865 S | 7/1998 | Powell et al. |
| D396,840 S | 8/1998 | Vita |
| 5,791,010 A | 8/1998 | Brady et al. |
| 5,819,361 A | 10/1998 | Merkel et al. |
| 5,836,110 A | 11/1998 | Buening |
| D402,953 S | 12/1998 | Kim |
| D404,354 S | 1/1999 | Witek et al. |
| D406,094 S | 2/1999 | Lai |
| D406,257 S | 3/1999 | Lee |
| D406,755 S | 3/1999 | Garganese |
| D406,756 S | 3/1999 | Garganese |
| 5,875,672 A | 3/1999 | Fourie et al. |
| 5,885,023 A | 3/1999 | Witek et al. |
| 5,889,334 A | 3/1999 | Hongo |
| 5,899,334 A | 5/1999 | Domerchie et al. |
| D411,161 S | 6/1999 | Wooten |
| D411,504 S | 6/1999 | Hsu |
| 5,907,885 A | 6/1999 | Tilli et al. |
| 5,911,358 A | 6/1999 | Kenner et al. |
| 5,920,947 A | 7/1999 | Varner |
| D413,261 S | 8/1999 | Yerich |
| D414,456 S | 9/1999 | Hussaini et al. |
| 5,970,569 A | 10/1999 | Merkel et al. |
| 5,970,570 A | 10/1999 | Groninger |
| D417,180 S | 11/1999 | Shih |
| D418,103 S | 12/1999 | Don |
| D418,474 S | 1/2000 | Witek et al. |
| D419,950 S | 2/2000 | Spector |
| 6,026,537 A | 2/2000 | Hojnacki |
| 6,055,697 A | 5/2000 | Wollenschlaeger |
| 6,063,216 A | 5/2000 | Damm et al. |
| D427,134 S | 6/2000 | Lee |
| 6,070,723 A | 6/2000 | Lewis |
| 6,088,872 A | 7/2000 | Schmid et al. |
| D430,097 S | 8/2000 | Breesch et al. |
| 6,101,665 A | 8/2000 | Sahara et al. |
| D431,223 S | 9/2000 | Breesch et al. |
| 6,119,301 A | 9/2000 | Nakatsukasa et al. |
| D431,520 S | 10/2000 | Breesch et al. |
| D432,072 S | 10/2000 | Breesch et al. |
| D434,715 S | 12/2000 | Wang |
| 6,158,078 A | 12/2000 | Kotlarski |
| 6,161,248 A | 12/2000 | Merkel et al. |
| 6,192,546 B1 | 2/2001 | Kotlarski |
| 6,202,251 B1 | 3/2001 | Kotlarski |
| 6,216,311 B1 | 4/2001 | Van Demme et al. |
| D442,537 S | 5/2001 | Kim |
| 6,226,829 B1 | 5/2001 | Kotlarski |
| D443,245 S | 6/2001 | Kim |
| D443,582 S | 6/2001 | De Block |
| D443,854 S | 6/2001 | De Block |
| 6,247,590 B1 | 6/2001 | Baker |
| D444,760 S | 7/2001 | Houssat et al. |
| D445,754 S | 7/2001 | Benoit |
| 6,266,843 B1 | 7/2001 | Doman et al. |
| 6,279,191 B1 | 8/2001 | Kotlarski et al. |
| 6,279,746 B1 | 8/2001 | Hussaini et al. |
| D448,295 S | 9/2001 | Mozes |
| 6,286,176 B1 | 9/2001 | Westermann et al. |
| 6,292,974 B1 | 9/2001 | Merkel et al. |
| 6,295,690 B1 | 10/2001 | Merkel et al. |
| 6,301,742 B1 | 10/2001 | Kota |
| 6,305,066 B1 | 10/2001 | De Paoli et al. |
| 6,308,373 B1 | 10/2001 | Merkel et al. |
| 6,327,738 B1 | 12/2001 | Lewis |
| 6,332,236 B1 | 12/2001 | Ku |
| 6,336,243 B1 | 1/2002 | Charng |
| D453,316 S | 2/2002 | Watanabe |
| 6,363,569 B1 | 4/2002 | Kotlarski |
| 6,367,117 B1 | 4/2002 | Sahara et al. |
| D457,479 S | 5/2002 | De Block et al. |
| 6,393,654 B2 | 5/2002 | Nacamuli |
| 6,397,428 B2 | 6/2002 | Kotlarski |
| 6,415,473 B1 | 7/2002 | Rapp |
| D462,044 S | 8/2002 | Gfatter et al. |
| 6,427,282 B1 | 8/2002 | Kotlarski |

(56) References Cited

U.S. PATENT DOCUMENTS

| | | |
|---|---|---|
| 6,434,780 B1 | 8/2002 | Kotlarski |
| D462,262 S | 9/2002 | Leja |
| 6,449,797 B1 | 9/2002 | De Block |
| 6,453,505 B1 | 9/2002 | Terai |
| D464,012 S | 10/2002 | Hussaini et al. |
| D464,600 S | 10/2002 | Chen |
| 6,499,181 B1 | 12/2002 | Kotlarski |
| D469,731 S | 2/2003 | Geer |
| 6,513,186 B1 | 2/2003 | Zimmer |
| 6,516,491 B2 | 2/2003 | Merkel et al. |
| 6,523,218 B1 | 2/2003 | Kotlarski |
| D471,505 S | 3/2003 | Wang |
| 6,530,111 B1 | 3/2003 | Kotlarski |
| D472,510 S | 4/2003 | Lin |
| D473,180 S | 4/2003 | Sun |
| D473,507 S | 4/2003 | Huang |
| 6,550,096 B1 | 4/2003 | Stewart et al. |
| 6,553,607 B1 | 4/2003 | De Block |
| D474,143 S | 5/2003 | Ho |
| 6,564,441 B2 | 5/2003 | Ibe et al. |
| 6,581,237 B1 | 6/2003 | Kotlarski |
| 6,606,759 B1 | 8/2003 | Hoshino |
| 6,609,267 B1 | 8/2003 | Journee et al. |
| 6,611,988 B1 | 9/2003 | De Block |
| 6,619,094 B2 | 9/2003 | Juhl |
| 6,622,540 B2 | 9/2003 | Jones et al. |
| 6,625,842 B1 | 9/2003 | De Block |
| 6,632,738 B2 | 10/2003 | Sone |
| 6,634,056 B1 | 10/2003 | De Block |
| 6,640,380 B2 | 11/2003 | Rosenstein et al. |
| 6,643,889 B1 | 11/2003 | Kotlarski |
| 6,651,292 B2 | 11/2003 | Komerska |
| 6,665,904 B1 | 12/2003 | Kerchaert |
| 6,668,419 B1 | 12/2003 | Kotlarski |
| 6,675,433 B1 | 1/2004 | Stewart et al. |
| 6,675,434 B1 | 1/2004 | Wilhelm et al. |
| 6,681,440 B2 | 1/2004 | Zimmer et al. |
| D487,047 S | 2/2004 | Kim |
| 6,687,948 B2 | 2/2004 | Kotlarski |
| 6,718,594 B1 | 4/2004 | Kotlarski |
| D490,763 S | 6/2004 | Kim |
| 6,766,906 B2 | 6/2004 | Charng |
| D494,125 S | 8/2004 | Leu |
| D494,527 S | 8/2004 | Hsu |
| D494,528 S | 8/2004 | Chiang |
| 6,785,931 B2 | 9/2004 | Lee et al. |
| 6,789,289 B2 | 9/2004 | Roodt |
| 6,792,644 B2 | 9/2004 | Roodt |
| 6,796,000 B2 | 9/2004 | Varner |
| 6,806,452 B2 | 10/2004 | Bos et al. |
| 6,810,555 B2 | 11/2004 | Ritt |
| 6,810,556 B1 | 11/2004 | Kotlarski |
| 6,813,803 B2 | 11/2004 | Leutsch |
| 6,813,923 B2 | 11/2004 | Jones et al. |
| 6,820,302 B2 | 11/2004 | Zimmer |
| 6,820,303 B2 | 11/2004 | Zimmer et al. |
| 6,820,304 B1 | 11/2004 | Gossez et al. |
| D499,962 S | 12/2004 | Lee et al. |
| D500,728 S | 1/2005 | Leu |
| 6,836,924 B2 | 1/2005 | Egan-Walter |
| 6,836,925 B1 | 1/2005 | Swanepoel |
| 6,836,926 B1 | 1/2005 | De Block |
| 6,836,927 B2 | 1/2005 | De Block et al. |
| D501,819 S | 2/2005 | Hsu |
| 6,857,160 B2 | 2/2005 | Weiler et al. |
| 6,859,971 B2 | 3/2005 | Siklosi |
| 6,874,195 B2 | 4/2005 | Kotlarski et al. |
| 6,883,966 B2 | 4/2005 | Zimmer |
| 6,886,213 B2 | 5/2005 | Merkel et al. |
| 6,904,639 B2 | 6/2005 | Dietrich et al. |
| 6,910,243 B1 | 6/2005 | Zimmer |
| 6,910,244 B2 | 6/2005 | De Block et al. |
| D508,226 S | 8/2005 | Lin |
| D508,888 S | 8/2005 | Carroll |
| 6,944,905 B2 | 9/2005 | De Block et al. |
| 6,946,810 B2 | 9/2005 | Kohlrausch |
| 6,951,043 B1 | 10/2005 | Fehrsen |
| D511,735 S | 11/2005 | Aoyama et al. |
| 6,964,079 B2 | 11/2005 | Zimmer |
| 6,964,080 B2 | 11/2005 | Knauf |
| 6,966,096 B2 | 11/2005 | Baseotto et al. |
| D512,362 S | 12/2005 | Breesch et al. |
| 6,973,698 B1 | 12/2005 | Kotlarski |
| 6,978,511 B2 | 12/2005 | Poton |
| 6,978,512 B2 | 12/2005 | Dietrich et al. |
| 7,007,339 B2 | 3/2006 | Weiler et al. |
| 7,024,722 B2 | 4/2006 | Neubauer et al. |
| 7,036,181 B2 | 5/2006 | Zimmer |
| D522,380 S | 6/2006 | Dibnah et al. |
| 7,055,207 B2 | 6/2006 | Coughlin |
| 7,055,208 B2 | 6/2006 | Merkel et al. |
| 7,076,829 B2 | 7/2006 | Ritt |
| D527,336 S | 8/2006 | Van Baelen |
| 7,093,317 B1 | 8/2006 | Zimmer |
| 7,134,163 B2 | 11/2006 | Varner |
| 7,137,167 B2 | 11/2006 | Torii et al. |
| 7,143,463 B2 | 12/2006 | Baseotto et al. |
| 7,150,065 B2 | 12/2006 | Zimmer |
| 7,150,066 B1 | 12/2006 | Huang |
| 7,150,795 B2 | 12/2006 | Javaruski et al. |
| 7,166,979 B2 | 1/2007 | Zimmer |
| 7,171,718 B2 | 2/2007 | Moein et al. |
| D538,218 S | 3/2007 | Elwell et al. |
| 7,196,440 B2 | 3/2007 | Lamprecht |
| 7,207,082 B2 | 4/2007 | Lee |
| 7,228,588 B2 | 6/2007 | Kraemer et al. |
| D546,669 S | 7/2007 | Sheppard et al. |
| D547,713 S | 7/2007 | Goeller |
| D549,151 S | 8/2007 | Janssis et al. |
| D549,152 S | 8/2007 | Goeller |
| 7,256,565 B2 | 8/2007 | Merkel et al. |
| 7,257,856 B2 | 8/2007 | Zimmer |
| 7,258,233 B2 | 8/2007 | Lee |
| 7,272,890 B2 | 9/2007 | Zimmer et al. |
| D552,486 S | 10/2007 | Herring et al. |
| 7,281,294 B2 | 10/2007 | Wilms et al. |
| D556,118 S | 11/2007 | Claes |
| 7,293,321 B2 | 11/2007 | Breesch |
| 7,299,520 B2 | 11/2007 | Huang |
| 7,316,047 B2 | 1/2008 | Thienard |
| 7,316,048 B2 | 1/2008 | Yamane et al. |
| 7,316,087 B1 | 1/2008 | Smith |
| D564,434 S | 3/2008 | Claes |
| D564,955 S | 3/2008 | Claes |
| 7,337,900 B2 | 3/2008 | Reiber et al. |
| 7,341,396 B2 | 3/2008 | Huang |
| 7,353,562 B2 | 4/2008 | Huang |
| D569,327 S | 5/2008 | Lin |
| D569,328 S | 5/2008 | Lin |
| 7,370,385 B2 | 5/2008 | Chiang |
| D573,457 S | 7/2008 | Park |
| 7,398,577 B2 | 7/2008 | Genet |
| D575,146 S | 8/2008 | Lee |
| D577,324 S | 9/2008 | McCray |
| 7,434,291 B2 | 10/2008 | Chiang |
| D579,849 S | 11/2008 | Garrastacho et al. |
| 7,451,520 B2 | 11/2008 | Weiler et al. |
| D582,765 S | 12/2008 | Gustafson et al. |
| 7,461,429 B2 | 12/2008 | Huang |
| 7,464,433 B2 | 12/2008 | Thomar et al. |
| D584,160 S | 1/2009 | Zimmermann |
| 7,472,451 B2 | 1/2009 | Hara et al. |
| D586,663 S | 2/2009 | Tidqvist |
| D586,716 S | 2/2009 | Radfar |
| D586,717 S | 2/2009 | Depondt |
| D587,186 S | 2/2009 | Herinckx et al. |
| 7,484,264 B2 | 2/2009 | Kraemer et al. |
| 7,493,672 B2 | 2/2009 | Op't Roodt |
| D588,933 S | 3/2009 | Bonzagni et al. |
| 7,503,095 B2 | 3/2009 | Lin et al. |
| 7,506,401 B2 | 3/2009 | Park |
| 7,509,704 B2 | 3/2009 | Bauer et al. |
| 7,523,519 B2 | 4/2009 | Egner-Walter et al. |
| 7,523,520 B2 | 4/2009 | Breesch |

(56) References Cited

U.S. PATENT DOCUMENTS

| | | |
|---|---|---|
| 7,523,522 B2 | 4/2009 | Herring et al. |
| D592,121 S | 5/2009 | Bratec et al. |
| 7,526,832 B2 | 5/2009 | Matsumoto et al. |
| 7,527,151 B2 | 5/2009 | Park |
| D593,480 S | 6/2009 | Kim |
| D593,923 S | 6/2009 | Bratec et al. |
| 7,543,353 B2 | 6/2009 | Ko |
| 7,552,502 B2 | 6/2009 | Kagawa et al. |
| D596,102 S | 7/2009 | Kim |
| 7,559,110 B1 | 7/2009 | Kotlarskl et al. |
| D601,077 S | 9/2009 | Kim |
| 7,581,280 B2 | 9/2009 | Op't Roodt et al. |
| 7,581,887 B2 | 9/2009 | Zimmer |
| 7,584,520 B2 | 9/2009 | Hussaini et al. |
| 7,596,479 B2 | 9/2009 | Weiler et al. |
| 7,603,741 B2 | 10/2009 | Verelst et al. |
| 7,603,742 B2 | 10/2009 | Nakano et al. |
| 7,607,194 B2 | 10/2009 | Weber et al. |
| 7,614,499 B2 | 11/2009 | Mueller |
| 7,621,016 B2 | 11/2009 | Verelst et al. |
| 7,628,560 B2 | 12/2009 | Westermann et al. |
| 7,634,833 B2 | 12/2009 | Boland et al. |
| 7,636,980 B2 | 12/2009 | Nakano |
| D608,717 S | 1/2010 | Aglassinger |
| D610,518 S | 2/2010 | Aglassinger |
| D610,519 S | 2/2010 | Aglassinger |
| D610,520 S | 2/2010 | Aglassinger |
| D611,809 S | 3/2010 | Borgerson et al. |
| 7,669,276 B2 | 3/2010 | Verelst et al. |
| 7,687,565 B2 | 3/2010 | Geilenkirchen |
| 7,690,073 B2 | 4/2010 | Marmoy et al. |
| 7,690,509 B2 | 4/2010 | Herring et al. |
| 7,699,169 B2 | 4/2010 | Lewis |
| D615,918 S | 5/2010 | Kim |
| 7,707,680 B2 | 5/2010 | Hawighorst et al. |
| 7,716,780 B2 | 5/2010 | Scholl et al. |
| 7,718,509 B2 | 5/2010 | Endo et al. |
| 7,743,457 B2 | 6/2010 | Metz |
| 7,748,076 B2 | 7/2010 | Weiler et al. |
| D621,322 S | 8/2010 | Lee et al. |
| 7,780,214 B2 | 8/2010 | Kraus et al. |
| 7,788,761 B2 | 9/2010 | Weiler et al. |
| 7,793,382 B2 | 9/2010 | Van De Rovaart |
| 7,797,787 B2 | 9/2010 | Wilms et al. |
| 7,805,800 B2 | 10/2010 | Wilms et al. |
| 7,810,206 B2 | 10/2010 | Weiler et al. |
| 7,814,611 B2 | 10/2010 | Heinrich et al. |
| D627,288 S | 11/2010 | Lee |
| 7,823,953 B2 | 11/2010 | Haas |
| 7,832,045 B2 | 11/2010 | Weiler et al. |
| 7,832,047 B2 | 11/2010 | Herinckx et al. |
| 7,836,542 B2 | 11/2010 | Dietrich et al. |
| 7,849,553 B2 | 12/2010 | Weiler et al. |
| D632,557 S | 2/2011 | Clamagirand et al. |
| 7,886,401 B2 | 2/2011 | Weber et al. |
| 7,891,043 B2 | 2/2011 | Kraus et al. |
| 7,891,044 B2 | 2/2011 | Fink et al. |
| 7,895,702 B2 | 3/2011 | Tisch et al. |
| 7,895,703 B2 | 3/2011 | Ina et al. |
| 7,898,141 B2 | 3/2011 | Hurst et al. |
| 7,899,596 B2 | 3/2011 | Zimmer et al. |
| 7,908,703 B2 | 3/2011 | van Bealen |
| 7,908,704 B2 | 3/2011 | Kraemer |
| 7,921,503 B1 | 4/2011 | Chiang |
| 7,921,504 B1 | 4/2011 | Chiang |
| 7,921,506 B2 | 4/2011 | Baek et al. |
| 7,926,659 B2 | 4/2011 | Kim |
| 7,930,796 B2 | 4/2011 | Weiler et al. |
| D637,132 S | 5/2011 | Kim |
| 7,937,798 B2 | 5/2011 | Fink et al. |
| 7,941,891 B2 | 5/2011 | Breesch |
| 7,941,892 B2 | 5/2011 | Kraus et al. |
| 7,945,985 B2 | 5/2011 | Stubner |
| 7,945,987 B2 | 5/2011 | Verelst et al. |
| 7,950,717 B2 | 5/2011 | Metz |
| 7,962,787 B2 | 6/2011 | Camilleri et al. |
| 7,966,689 B2 | 6/2011 | Rovaart et al. |
| 7,971,312 B2 | 7/2011 | Crabbee et al. |
| 7,975,849 B2 | 7/2011 | Kim |
| 7,979,950 B2 | 7/2011 | Boland |
| 7,989,955 B2 | 8/2011 | Yagi |
| 7,989,995 B2 | 8/2011 | Reith et al. |
| 7,992,248 B2 | 8/2011 | Koppen et al. |
| 7,996,953 B2 | 8/2011 | Braun et al. |
| D644,925 S | 9/2011 | Jaworski |
| 8,020,246 B2 | 9/2011 | Bauer et al. |
| 8,020,248 B2 | 9/2011 | Hasegawa |
| 8,020,249 B2 | 9/2011 | Masuda et al. |
| 8,024,836 B2 | 9/2011 | Moll et al. |
| 8,026,645 B2 | 9/2011 | Stubner et al. |
| D647,451 S | 10/2011 | Lin |
| 8,042,690 B2 | 10/2011 | Lewis |
| D647,795 S | 11/2011 | Eaton et al. |
| 8,051,526 B2 | 11/2011 | Summerville et al. |
| 8,060,976 B2 | 11/2011 | Mayer et al. |
| 8,069,528 B2 | 12/2011 | Verelst et al. |
| 8,076,807 B2 | 12/2011 | Bohn et al. |
| D651,509 S | 1/2012 | Methe et al. |
| 8,096,013 B2 | 1/2012 | Eschenbrenner et al. |
| 8,099,823 B2 | 1/2012 | Kraemer et al. |
| 8,104,134 B2 | 1/2012 | Ritt |
| 8,104,136 B2 | 1/2012 | Carangelo |
| 8,117,710 B2 | 2/2012 | Kraus et al. |
| 8,125,111 B2 | 2/2012 | Bohn et al. |
| 8,141,198 B2 | 3/2012 | Wilms et al. |
| 8,148,467 B2 | 4/2012 | Pieters et al. |
| 8,151,656 B2 | 4/2012 | Nicgorski, II |
| 8,156,604 B2 | 4/2012 | Kraus et al. |
| 8,156,605 B2 | 4/2012 | Dietrich et al. |
| 8,165,796 B2 | 4/2012 | Hoetzer |
| D658,494 S | 5/2012 | Raimer et al. |
| 8,166,605 B2 | 5/2012 | Lee |
| 8,169,791 B2 | 5/2012 | Wolf et al. |
| 8,180,518 B2 | 5/2012 | Petricoin, Jr. |
| 8,181,305 B2 | 5/2012 | Boos |
| 8,181,306 B2 | 5/2012 | Merkel |
| 8,181,307 B2 | 5/2012 | Wilms et al. |
| 8,181,308 B2 | 5/2012 | Kwon et al. |
| 8,186,002 B2 | 5/2012 | Kinnaert et al. |
| 8,191,200 B2 | 6/2012 | Kim |
| 8,191,201 B2 | 6/2012 | De Block et al. |
| 8,196,253 B2 | 6/2012 | Barlas |
| 8,196,254 B2 | 6/2012 | Mahfoudh et al. |
| 8,196,255 B2 | 6/2012 | De Block et al. |
| 8,205,290 B2 | 6/2012 | Weiler et al. |
| 8,205,291 B2 | 6/2012 | Eschenbrenner et al. |
| 8,214,965 B2 | 7/2012 | Volz et al. |
| 8,230,547 B2 | 7/2012 | Wilms et al. |
| 8,234,746 B2 | 8/2012 | Lutterodt et al. |
| 8,245,350 B2 | 8/2012 | Van De Rostyne et al. |
| 8,256,851 B2 | 9/2012 | Pelosse |
| 8,261,403 B2 | 9/2012 | Ehde |
| 8,261,405 B2 | 9/2012 | Kim et al. |
| 8,261,628 B2 | 9/2012 | Moecklin et al. |
| 8,266,759 B2 | 9/2012 | Braun et al. |
| 8,272,096 B2 | 9/2012 | Wilms et al. |
| 8,272,360 B2 | 9/2012 | Hartmann et al. |
| 8,286,533 B2 | 10/2012 | Hurst et al. |
| 8,294,327 B2 | 10/2012 | Chaumet et al. |
| D671,827 S | 12/2012 | Raimer et al. |
| 8,322,456 B2 | 12/2012 | Pozgay et al. |
| 8,327,500 B2 | 12/2012 | De Block et al. |
| 8,328,011 B2 | 12/2012 | Skurdalsvold et al. |
| 8,333,093 B2 | 12/2012 | Kleckner et al. |
| D674,733 S | 1/2013 | Lee |
| 8,341,799 B2 | 1/2013 | Koppen et al. |
| 8,347,449 B2 | 1/2013 | Genet et al. |
| 8,356,520 B2 | 1/2013 | Hurst et al. |
| 8,359,701 B2 | 1/2013 | De Block et al. |
| 8,361,595 B2 | 1/2013 | Van De Rostyne et al. |
| 8,370,986 B2 | 2/2013 | Wilms et al. |
| 8,370,987 B2 | 2/2013 | Ritt |
| 8,370,988 B2 | 2/2013 | Kraus et al. |
| 8,373,322 B2 | 2/2013 | Wegner et al. |

(56) References Cited

U.S. PATENT DOCUMENTS

| | | |
|---|---|---|
| 8,375,503 B2 | 2/2013 | Aznag |
| 8,381,348 B2 | 2/2013 | Egner-Walter et al. |
| 8,381,349 B2 | 2/2013 | Ku |
| 8,381,350 B2 | 2/2013 | Op't Roodt et al. |
| 8,397,340 B2 | 3/2013 | Weiler et al. |
| 8,397,341 B2 | 3/2013 | Ehde |
| D679,234 S | 4/2013 | Depondt |
| D679,235 S | 4/2013 | Depondt |
| D680,051 S | 4/2013 | Tolentino et al. |
| 8,410,651 B2 | 4/2013 | Lauk |
| 8,413,291 B2 | 4/2013 | Wu |
| 8,413,292 B2 | 4/2013 | Yang et al. |
| 8,418,644 B2 | 4/2013 | Fiedor et al. |
| 8,424,149 B2 | 4/2013 | Coemans et al. |
| 8,429,786 B2 | 4/2013 | Van Baelen et al. |
| 8,434,621 B2 | 5/2013 | Hun et al. |
| 8,448,289 B2 | 5/2013 | Reith et al. |
| 8,448,290 B2 | 5/2013 | Op't Roodt et al. |
| D684,862 S | 6/2013 | DiFranza |
| 8,453,292 B2 | 6/2013 | Jeon |
| D685,260 S | 7/2013 | Thielemier |
| D686,912 S | 7/2013 | Ehde et al. |
| 8,474,088 B2 | 7/2013 | Wu |
| 8,484,794 B2 | 7/2013 | Westermann et al. |
| 8,490,239 B2 | 7/2013 | Ehde |
| 8,495,787 B2 | 7/2013 | Garrastacho et al. |
| 8,499,408 B2 | 8/2013 | Boland |
| 8,505,151 B2 | 8/2013 | Depondt et al. |
| 8,505,152 B2 | 8/2013 | Boland |
| 8,505,724 B2 | 8/2013 | Bult et al. |
| 8,510,895 B2 | 8/2013 | Beelen et al. |
| 8,510,897 B2 | 8/2013 | Ku |
| 8,510,898 B2 | 8/2013 | Ku |
| 8,522,393 B2 | 9/2013 | Boland |
| 8,539,634 B2 | 9/2013 | Wilms et al. |
| 8,544,136 B2 | 10/2013 | Kraemer et al. |
| 8,544,137 B2 | 10/2013 | Thienard |
| 8,549,695 B2 | 10/2013 | Reith et al. |
| 8,552,113 B2 | 10/2013 | Pieters et al. |
| 8,555,455 B2 | 10/2013 | Boland |
| 8,555,456 B2 | 10/2013 | Ehde |
| 8,561,717 B2 | 10/2013 | Pozgay et al. |
| D692,750 S | 11/2013 | Ehde et al. |
| D692,818 S | 11/2013 | Tolentino et al. |
| D692,819 S | 11/2013 | Tolentino et al. |
| D693,213 S | 11/2013 | Lee et al. |
| 8,574,791 B2 | 11/2013 | Maus et al. |
| 8,575,078 B2 | 11/2013 | Duval et al. |
| 8,581,530 B2 | 11/2013 | Tisch |
| 8,582,809 B2 | 11/2013 | Halimeh et al. |
| 8,584,303 B2 | 11/2013 | Wolfgarten et al. |
| 8,590,097 B2 | 11/2013 | Bohn et al. |
| D695,632 S | 12/2013 | Akana et al. |
| 8,595,888 B2 | 12/2013 | Op't Roodt et al. |
| 8,595,889 B2 | 12/2013 | Op't Roodt et al. |
| 8,613,357 B2 | 12/2013 | Putnam |
| D697,790 S | 1/2014 | Iwegbu |
| 8,646,181 B2 | 2/2014 | Baumann et al. |
| D700,524 S | 3/2014 | Ferriter |
| 8,661,602 B2 | 3/2014 | Op't Roodt et al. |
| D702,619 S | 4/2014 | Kim |
| 8,686,612 B2 | 4/2014 | Roos et al. |
| 8,707,506 B1 | 4/2014 | Wu |
| D704,127 S | 5/2014 | Depondt |
| D704,128 S | 5/2014 | Depondt |
| D704,129 S | 5/2014 | Depondt |
| D704,619 S | 5/2014 | Kim |
| D704,620 S | 5/2014 | Kim |
| 8,717,011 B2 | 5/2014 | Henning |
| 8,719,994 B2 | 5/2014 | Thienard et al. |
| 8,720,033 B2 | 5/2014 | Koppen et al. |
| 8,728,367 B2 | 5/2014 | Lay et al. |
| D706,200 S | 6/2014 | Tolentino et al. |
| D706,201 S | 6/2014 | Depondt |
| D706,202 S | 6/2014 | Depondt |
| 8,745,812 B2 | 6/2014 | Kruse et al. |
| 8,745,813 B2 | 6/2014 | Ishida et al. |
| 8,749,186 B2 | 6/2014 | Stubner et al. |
| 8,759,449 B2 | 6/2014 | Pieters et al. |
| D708,890 S | 7/2014 | Kim et al. |
| D709,362 S | 7/2014 | Kim |
| 8,769,762 B2 | 7/2014 | Op't Roodt et al. |
| 8,770,063 B2 | 7/2014 | Bhatti |
| 8,782,847 B2 | 7/2014 | Depondt |
| D711,217 S | 8/2014 | Jacobs et al. |
| 8,800,097 B2 | 8/2014 | Wegner et al. |
| 8,800,099 B2 | 8/2014 | Boland |
| 8,806,700 B2 | 8/2014 | Tolentino et al. |
| 8,813,608 B2 | 8/2014 | Hurst et al. |
| 8,823,228 B2 | 9/2014 | Mili et al. |
| 8,839,483 B2 | 9/2014 | Roodt et al. |
| D714,635 S | 10/2014 | Demar et al. |
| D715,142 S | 10/2014 | Allen et al. |
| 8,850,653 B2 | 10/2014 | Depondt |
| 8,854,455 B2 | 10/2014 | Haug |
| 8,857,595 B2 | 10/2014 | Mili et al. |
| 8,863,370 B2 | 10/2014 | Weiler et al. |
| 8,871,994 B2 | 10/2014 | Wei et al. |
| D717,225 S | 11/2014 | Kuo |
| 8,881,338 B2 | 11/2014 | Thielen et al. |
| 8,893,348 B2 | 11/2014 | Vankerkhove et al. |
| 8,909,421 B2 | 12/2014 | Zimmer |
| 8,913,132 B2 | 12/2014 | Seger et al. |
| 8,913,133 B2 | 12/2014 | Huelsen et al. |
| 8,917,323 B2 | 12/2014 | Seger et al. |
| 8,931,133 B2 | 1/2015 | Coart et al. |
| 8,935,056 B2 | 1/2015 | Zimmer |
| 8,938,847 B2 | 1/2015 | Avasiloaie et al. |
| 8,950,034 B2 | 2/2015 | Wilms |
| 8,950,035 B2 | 2/2015 | Benner et al. |
| 8,957,619 B2 | 2/2015 | Karcher |
| 8,963,464 B2 | 2/2015 | Braun et al. |
| D725,025 S | 3/2015 | Poton |
| 8,973,207 B2 | 3/2015 | Depondt |
| 8,973,209 B2 | 3/2015 | Depondt |
| 8,979,066 B2 | 3/2015 | Pfetzer et al. |
| 8,984,707 B2 | 3/2015 | Boland |
| 8,985,241 B2 | 3/2015 | Pozgay et al. |
| 8,997,304 B2 | 4/2015 | Oslizlo et al. |
| 9,003,594 B2 | 4/2015 | Guidez |
| 9,003,596 B2 | 4/2015 | Avasiloaie et al. |
| 9,008,905 B2 | 4/2015 | Prskawetz et al. |
| 9,015,896 B2 | 4/2015 | De Block |
| 9,018,877 B2 | 4/2015 | Braun et al. |
| 9,021,651 B2 | 5/2015 | Wolfgarten |
| 9,021,652 B2 | 5/2015 | Coemans et al. |
| 9,045,111 B2 | 6/2015 | Zimmer |
| 9,045,113 B2 | 6/2015 | Aznag et al. |
| 9,050,946 B2 | 6/2015 | Zimmer et al. |
| 9,056,595 B2 | 6/2015 | Wegner et al. |
| 9,071,089 B2 | 6/2015 | Kastinger et al. |
| 9,073,519 B2 | 7/2015 | Depondt |
| 9,079,567 B2 | 7/2015 | Wegner et al. |
| 9,096,196 B2 | 8/2015 | Criel et al. |
| 9,108,595 B2 | 8/2015 | Tolentino et al. |
| 9,114,754 B2 | 8/2015 | Ehlgen et al. |
| 9,114,783 B2 | 8/2015 | Depondt |
| 9,120,463 B2 | 9/2015 | Kim et al. |
| 9,120,464 B2 | 9/2015 | Pack et al. |
| 9,151,372 B2 | 10/2015 | Keller |
| 9,174,609 B2 | 11/2015 | Tolentino et al. |
| 9,174,611 B2 | 11/2015 | Tolentino et al. |
| 9,180,839 B2 | 11/2015 | Oslizlo et al. |
| D744,331 S | 12/2015 | Vos et al. |
| 9,211,867 B2 | 12/2015 | Beelen et al. |
| 9,211,868 B2 | 12/2015 | Bousset et al. |
| 9,225,274 B2 | 12/2015 | Lingenfelser et al. |
| D746,700 S | 1/2016 | Boehnen et al. |
| 9,227,596 B2 | 1/2016 | Van De Rovaart et al. |
| 9,227,598 B2 | 1/2016 | Smets et al. |
| 9,233,664 B2 | 1/2016 | Weidlich |
| 9,254,820 B2 | 2/2016 | Geubel et al. |
| 9,260,085 B2 | 2/2016 | Bex et al. |
| 9,266,504 B2 | 2/2016 | De Block |

(56) References Cited

U.S. PATENT DOCUMENTS

| | | |
|---|---|---|
| 9,272,676 B2 | 3/2016 | Heger et al. |
| D765,501 S | 9/2016 | Peers et al. |
| 9,505,380 B2 | 11/2016 | Tolentino et al. |
| D777,079 S | 1/2017 | Tolentino et al. |
| D784,804 S | 4/2017 | Peers et al. |
| D787,308 S | 5/2017 | Kawashima et al. |
| D787,312 S | 5/2017 | Peers et al. |
| D796,413 S | 9/2017 | Di Iulio |
| 2001/0013236 A1 | 8/2001 | Weyerstall et al. |
| 2002/0043092 A1 | 4/2002 | Jones et al. |
| 2002/0112306 A1 | 8/2002 | Komerska |
| 2002/0174505 A1 | 11/2002 | Kim |
| 2002/0192017 A1 | 12/2002 | Rosenstein et al. |
| 2003/0014828 A1 | 1/2003 | Edner-Walter et al. |
| 2003/0028990 A1 | 2/2003 | Zimmer |
| 2003/0033683 A1 | 2/2003 | Kotlarski |
| 2003/0074763 A1 | 4/2003 | Egner-Walter et al. |
| 2003/0159229 A1 | 8/2003 | Weiler et al. |
| 2003/0209049 A1 | 11/2003 | Jones et al. |
| 2003/0221276 A1 | 12/2003 | Siklosi |
| 2003/0229961 A1 | 12/2003 | Barnett |
| 2004/0010882 A1 | 1/2004 | Breesch |
| 2004/0025280 A1 | 2/2004 | Krickau et al. |
| 2004/0025281 A1 | 2/2004 | Baseotto et al. |
| 2004/0052577 A1 | 3/2004 | Lee et al. |
| 2004/0098821 A1 | 5/2004 | Kraemer et al. |
| 2004/0159994 A1 | 8/2004 | Lenzen et al. |
| 2004/0211021 A1 | 10/2004 | Weber et al. |
| 2004/0244137 A1 | 12/2004 | Poton |
| 2004/0250369 A1 | 12/2004 | Matsumoto et al. |
| 2005/0005387 A1 | 1/2005 | Kinoshita et al. |
| 2005/0011033 A1 | 1/2005 | Thomar et al. |
| 2005/0039292 A1 | 2/2005 | Boland |
| 2005/0166349 A1 | 8/2005 | Nakano et al. |
| 2005/0177970 A1 | 8/2005 | Scholl et al. |
| 2005/0252812 A1 | 11/2005 | Lewis |
| 2006/0010636 A1 | 1/2006 | Vacher |
| 2006/0026786 A1 | 2/2006 | Ku |
| 2006/0112511 A1 | 6/2006 | Op't Roodt et al. |
| 2006/0117515 A1 | 6/2006 | Fink et al. |
| 2006/0130263 A1 | 6/2006 | Coughlin |
| 2006/0156529 A1 | 7/2006 | Thomar et al. |
| 2006/0179597 A1 | 8/2006 | Hoshino et al. |
| 2006/0218740 A1 | 10/2006 | Coughlin |
| 2006/0230571 A1 | 10/2006 | Son |
| 2006/0248675 A1 | 11/2006 | Vacher et al. |
| 2006/0282972 A1 | 12/2006 | Huang |
| 2007/0017056 A1 | 1/2007 | Cooke et al. |
| 2007/0067939 A1 | 3/2007 | Huang |
| 2007/0067941 A1 | 3/2007 | Huang |
| 2007/0089257 A1 | 4/2007 | Harita et al. |
| 2007/0089527 A1 | 4/2007 | Shank et al. |
| 2007/0186366 A1 | 8/2007 | Alley |
| 2007/0220698 A1 | 9/2007 | Huang |
| 2007/0226940 A1 | 10/2007 | Thienard |
| 2007/0226941 A1 | 10/2007 | Kraemer et al. |
| 2007/0234501 A1 | 10/2007 | Ho et al. |
| 2007/0266517 A1 | 11/2007 | Kim et al. |
| 2008/0052865 A1 | 3/2008 | Chiang |
| 2008/0083082 A1 | 4/2008 | Rovaart et al. |
| 2008/0086830 A1 | 4/2008 | Kim |
| 2008/0092320 A1 | 4/2008 | Cempura et al. |
| 2008/0098554 A1 | 5/2008 | Cho |
| 2008/0098559 A1 | 5/2008 | Machida et al. |
| 2008/0115308 A1 | 5/2008 | Lee |
| 2008/0148509 A1 | 6/2008 | Bacarella et al. |
| 2008/0196192 A1 | 8/2008 | Yao |
| 2008/0222830 A1 | 9/2008 | Chiang |
| 2008/0222831 A1 | 9/2008 | Thienard |
| 2008/0222832 A1 | 9/2008 | Huang |
| 2008/0263805 A1 | 10/2008 | Sebring |
| 2008/0289133 A1 | 11/2008 | Kim |
| 2009/0007364 A1 | 1/2009 | Jarasson et al. |
| 2009/0013492 A1 | 1/2009 | Henin |
| 2009/0056049 A1 | 3/2009 | Jarasson et al. |
| 2009/0064440 A1 | 3/2009 | Boland |
| 2009/0126140 A1 | 5/2009 | Heinrich et al. |
| 2009/0151110 A1 | 6/2009 | Ku |
| 2009/0158545 A1 | 6/2009 | Grasso et al. |
| 2009/0158547 A1 | 6/2009 | Kim |
| 2009/0172910 A1 | 7/2009 | De Block et al. |
| 2009/0178226 A1 | 7/2009 | Lee et al. |
| 2009/0197047 A1 | 8/2009 | Teranishi |
| 2009/0199357 A1 | 8/2009 | Thienard |
| 2010/0000041 A1 | 1/2010 | Boland |
| 2010/0005608 A1 | 1/2010 | Chien |
| 2010/0005609 A1 | 1/2010 | Kim |
| 2010/0024149 A1 | 2/2010 | Erdal |
| 2010/0024151 A1 | 2/2010 | Ku |
| 2010/0050360 A1 | 3/2010 | Chiang |
| 2010/0050361 A1 | 3/2010 | Chang et al. |
| 2010/0064468 A1 | 3/2010 | Kang |
| 2010/0083454 A1 | 4/2010 | Op't Roodt et al. |
| 2010/0186185 A1 | 7/2010 | Grasso et al. |
| 2010/0205763 A1 | 8/2010 | Ku |
| 2010/0212101 A1 | 8/2010 | Thienard et al. |
| 2010/0236008 A1 | 9/2010 | Yang et al. |
| 2010/0236675 A1 | 9/2010 | Schneider |
| 2010/0242204 A1 | 9/2010 | Chien |
| 2010/0251502 A1 | 10/2010 | Summerville et al. |
| 2010/0281645 A1 | 11/2010 | Kim et al. |
| 2011/0005020 A1 | 1/2011 | Koppen et al. |
| 2011/0041280 A1 | 2/2011 | Choi et al. |
| 2011/0047742 A1 | 3/2011 | Kim et al. |
| 2011/0072607 A1 | 3/2011 | Van Bealen et al. |
| 2011/0107542 A1 | 5/2011 | Op't Roodt |
| 2011/0113582 A1 | 5/2011 | Kruse et al. |
| 2011/0113583 A1 | 5/2011 | Shanmugham et al. |
| 2011/0162161 A1 | 7/2011 | Amado |
| 2011/0192511 A1 | 8/2011 | Marrone |
| 2011/0219563 A1 | 9/2011 | Guastella et al. |
| 2011/0277264 A1 | 11/2011 | Ehde |
| 2011/0277266 A1 | 11/2011 | Umeno |
| 2012/0027206 A1 | 2/2012 | Suzuki et al. |
| 2012/0030894 A1 | 2/2012 | Garrastacho et al. |
| 2012/0047673 A1 | 3/2012 | Depondt |
| 2012/0054976 A1* | 3/2012 | Yang .................... B60S 1/3867 15/250.32 |
| 2012/0060316 A1 | 3/2012 | Avasiloaie et al. |
| 2012/0066857 A1 | 3/2012 | Webert |
| 2012/0090123 A1 | 4/2012 | Caillot et al. |
| 2012/0102669 A1 | 5/2012 | Lee et al. |
| 2012/0144615 A1 | 6/2012 | Song et al. |
| 2012/0159733 A1 | 6/2012 | Kwon |
| 2012/0180245 A1 | 7/2012 | Ku |
| 2012/0180246 A1 | 7/2012 | Ku |
| 2012/0186035 A1 | 7/2012 | Lee |
| 2012/0266405 A1 | 10/2012 | Tolentinto et al. |
| 2012/0279008 A1 | 11/2012 | Depondt |
| 2012/0311808 A1 | 12/2012 | Yang et al. |
| 2012/0317740 A1 | 12/2012 | Yang et al. |
| 2013/0025084 A1 | 1/2013 | Tolentino et al. |
| 2013/0067674 A1 | 3/2013 | Chiang |
| 2013/0067675 A1 | 3/2013 | Chien |
| 2013/0067678 A1 | 3/2013 | Ehde |
| 2013/0104334 A1 | 5/2013 | Depondt |
| 2013/0117957 A1 | 5/2013 | Ku |
| 2013/0125333 A1 | 5/2013 | Tolentino et al. |
| 2013/0152323 A1 | 6/2013 | Chien |
| 2013/0152326 A1 | 6/2013 | Oslizlo et al. |
| 2013/0152330 A1 | 6/2013 | Kim et al. |
| 2013/0167316 A1 | 7/2013 | Egner-Walter et al. |
| 2013/0185889 A1 | 7/2013 | Tolentino et al. |
| 2013/0185890 A1 | 7/2013 | Ku |
| 2013/0192015 A1 | 8/2013 | Tolentino et al. |
| 2013/0192016 A1 | 8/2013 | Kim et al. |
| 2013/0198992 A1 | 8/2013 | Tolentino et al. |
| 2013/0205532 A1 | 8/2013 | Tolentino et al. |
| 2013/0212828 A1 | 8/2013 | Coughlin |
| 2013/0219649 A1 | 8/2013 | Tolentinto et al. |
| 2013/0227809 A1 | 9/2013 | Tolentinto et al. |
| 2013/0227810 A1 | 9/2013 | Tolentinto et al. |
| 2013/0247323 A1 | 9/2013 | Geubel et al. |
| 2013/0255026 A1 | 10/2013 | Depondt |

(56) References Cited

U.S. PATENT DOCUMENTS

| | | |
|---|---|---|
| 2013/0263400 A1 | 10/2013 | Duesterhoeft et al. |
| 2013/0291329 A1 | 11/2013 | Izabel |
| 2013/0298348 A1 | 11/2013 | Caillot et al. |
| 2013/0305475 A1 | 11/2013 | Kim et al. |
| 2013/0305478 A1 | 11/2013 | Kim et al. |
| 2013/0333145 A1 | 12/2013 | Depondt |
| 2013/0333146 A1 | 12/2013 | Depondt |
| 2014/0026348 A1 | 1/2014 | Schaeuble |
| 2014/0026349 A1 | 1/2014 | Schaeuble |
| 2014/0026350 A1 | 1/2014 | Boland |
| 2014/0068886 A1 | 3/2014 | Ku |
| 2014/0082875 A1 | 3/2014 | Peers et al. |
| 2014/0115811 A1 | 5/2014 | Kim et al. |
| 2014/0130283 A1 | 5/2014 | Boland et al. |
| 2014/0130287 A1 | 5/2014 | Bex et al. |
| 2014/0150198 A1 | 6/2014 | Kim et al. |
| 2014/0182075 A1 | 7/2014 | Polocoser et al. |
| 2014/0196241 A1 | 7/2014 | Kim et al. |
| 2014/0259504 A1 | 9/2014 | Piotrowski et al. |
| 2014/0259505 A1 | 9/2014 | Fournier et al. |
| 2014/0283325 A1 | 9/2014 | Kawashima et al. |
| 2014/0317875 A1 | 10/2014 | Tolentino et al. |
| 2014/0338144 A1 | 11/2014 | An et al. |
| 2014/0359963 A1 | 12/2014 | An et al. |
| 2014/0373301 A1 | 12/2014 | Kim et al. |
| 2015/0026908 A1 | 1/2015 | Izabel et al. |
| 2015/0047141 A1 | 2/2015 | Houssat et al. |
| 2015/0059116 A1 | 3/2015 | An et al. |
| 2015/0074935 A1 | 3/2015 | An et al. |
| 2015/0089764 A1 | 4/2015 | Wu |
| 2015/0121644 A1 | 5/2015 | Young, III et al. |
| 2015/0135468 A1 | 5/2015 | Kim |
| 2015/0151718 A1 | 6/2015 | Moll |
| 2015/0158463 A1 | 6/2015 | Yi |
| 2015/0166016 A1 | 6/2015 | Wang |
| 2015/0246659 A1 | 9/2015 | Park |
| 2015/0251636 A1 | 9/2015 | Kim et al. |
| 2015/0251637 A1 | 9/2015 | Tolentino et al. |
| 2015/0258965 A1 | 9/2015 | An |
| 2015/0274130 A1 | 10/2015 | Tolentinto et al. |
| 2015/0274131 A1 | 10/2015 | Tolentinto et al. |
| 2015/0353054 A1 | 12/2015 | Tolentino et al. |
| 2016/0046263 A1 | 2/2016 | Tolentino et al. |
| 2016/0059828 A1 | 3/2016 | Tolentino et al. |
| 2016/0159323 A1 | 6/2016 | Tolentinto et al. |
| 2016/0280186 A1 | 9/2016 | Peers et al. |
| 2016/0375867 A1 | 12/2016 | Tolentino et al. |
| 2017/0057464 A1 | 3/2017 | Tolentinto et al. |
| 2017/0072912 A1 | 3/2017 | Tolentino et al. |
| 2017/0113656 A1 | 4/2017 | Tolentino |
| 2017/0334400 A1 | 11/2017 | Kawashima |
| 2017/0334406 A1 | 11/2017 | Kawashima |
| 2017/0334407 A1 | 11/2017 | Kawashima |
| 2017/0334769 A1 | 11/2017 | Luzzato et al. |

FOREIGN PATENT DOCUMENTS

| | | | |
|---|---|---|---|
| DE | 4224866 B4 | | 1/2007 |
| EP | 2781416 A1 | | 9/2014 |
| EP | 3078555 | * | 10/2016 |
| WO | 2017/201458 A1 | | 11/2017 |
| WO | 2017/201464 A1 | | 11/2017 |
| WO | 2017/201470 A1 | | 11/2017 |
| WO | 2017/201473 A1 | | 11/2017 |
| WO | 2017/201485 A1 | | 11/2017 |

OTHER PUBLICATIONS

International Search Report arid Written Opinion issued in PCT Application No. PCT/US2017/059275 dated Jan. 25, 2018.
Naedele, M.,"An Access Control Protocol for Embedded Devices," Industrial Informatics, 2006 IEEE International Conference on IEEE, PI, dated Aug. 1, 2006, Retrieved from the Internet URL: http://ieeexplore.ieee.org/document/4053450/, pp. 565-569.
"DuPont Wiper Blade Installation: Trapezoid Arm Style," Pylon Manufacturing Corp., dated Jan. 1, 2015, Retrieved from the Internet URL: http://http://windshield-wiperblades.com/resources?do=installation_removal&country=United%20States#, on Jul. 28, 2017, pp. 1-2.
"First Time Fit Wiper Blades: Top Lock 1 Connector Wiper Blade Installation Instructions" DENSO Auto Parts, Retrieved from the Internet URL: http://densoautoparts.com/wiper-blades-first-time-fit-wiper-blades.aspx#undefined, on Jul. 28, 2017, pp. 1-3.
Final Rejection towards U.S. Appl. No. 13/679,646 dated Jul. 14, 2017.
Office Action issued in connection with EP Application No. 12171721.9 dated Aug. 16, 2017.
Non-Final Rejection towards U.S. Appl. No. 14/715,144 dated Nov. 15, 2017.
International Search Report and Written Opinion issued in PCT Application No. PCT/US2017/033622 dated Aug. 11, 2017.
International Search Report and Written Opinion issued in PCT Application No. PCT/US2017/033629 dated Aug. 22, 2017.
International Search Report and Written Opinion issued in PCT Application No. PCT/US2017/033640 dated Aug. 23, 2017.
International Search Report and Written Opinion issued in PCT Application No. PCT/US2017/033657 dated Sep. 28, 2017.
International Search Report and Written Opinion issued in PCT Application No. PCT/US2017/033643 dated Oct. 2, 2017.

* cited by examiner

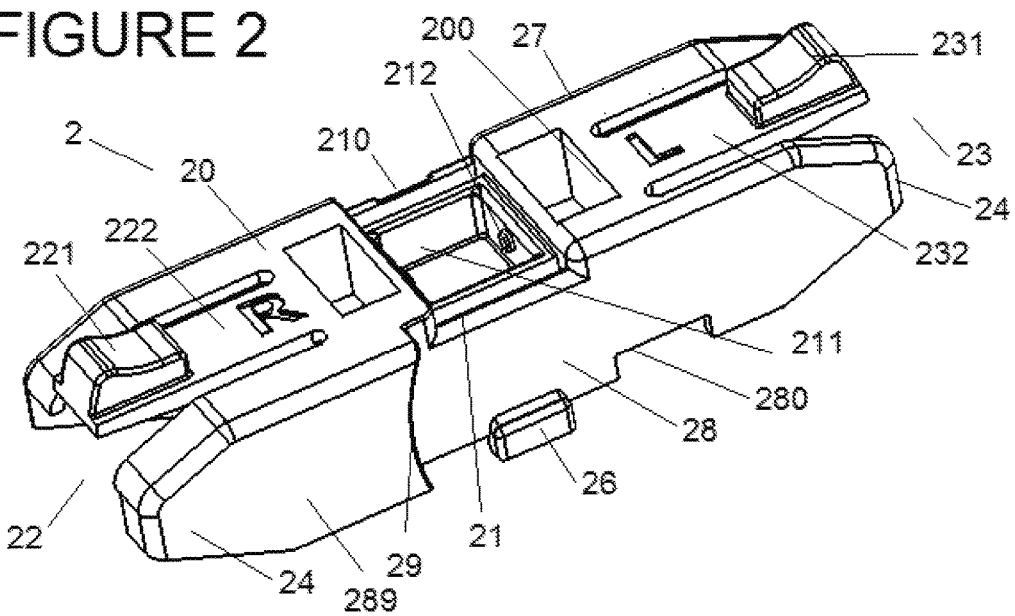
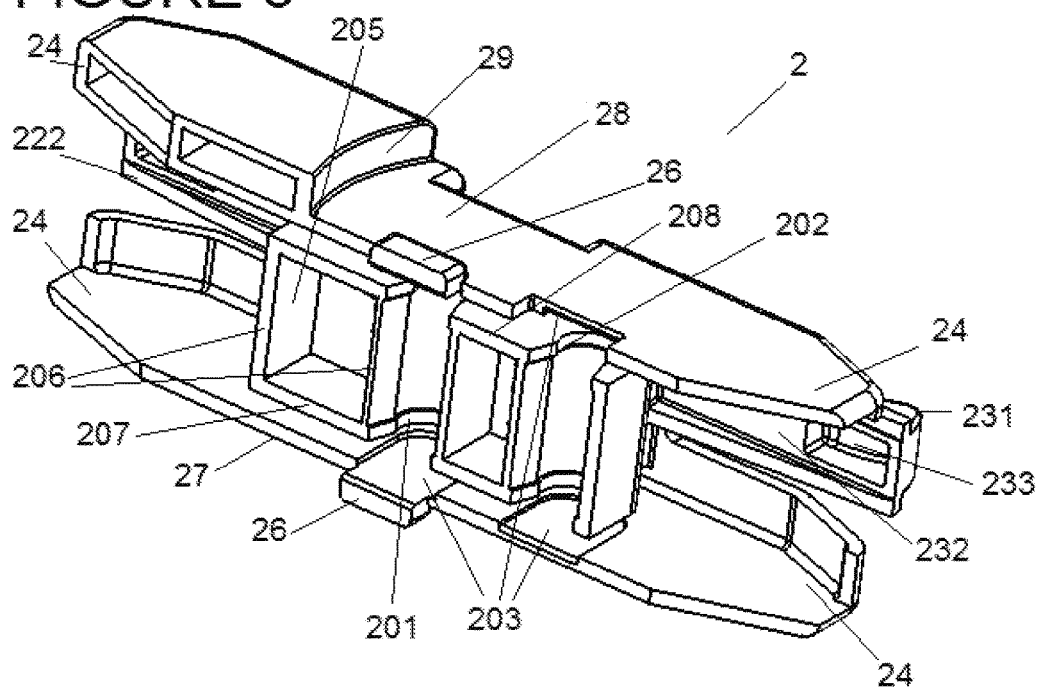

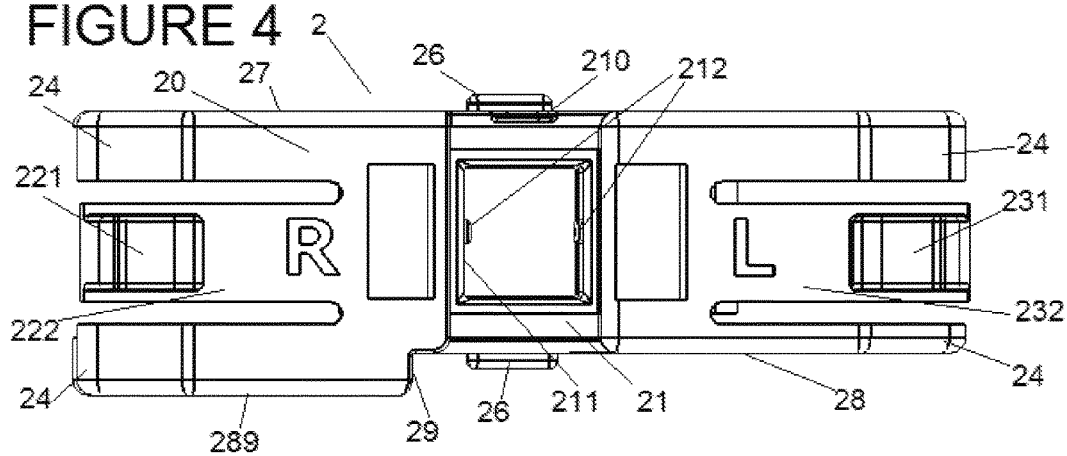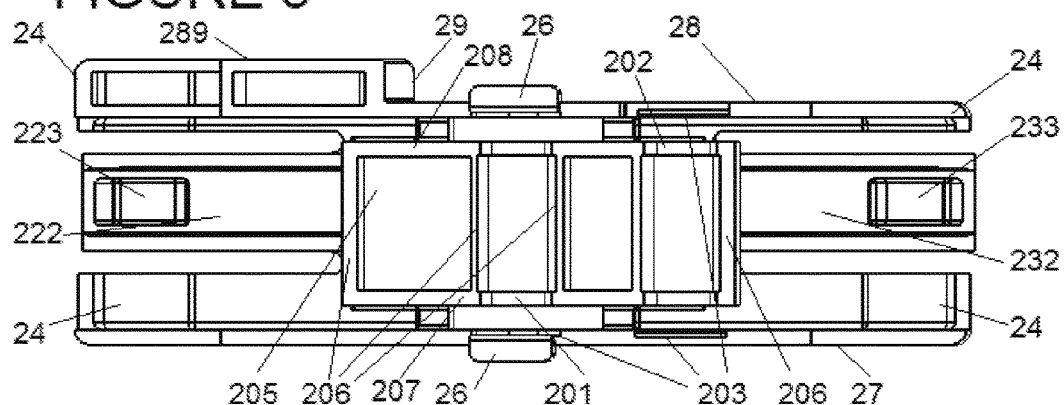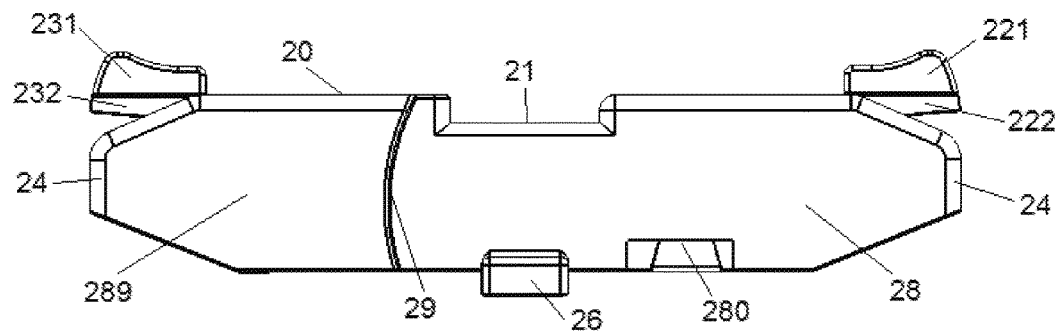

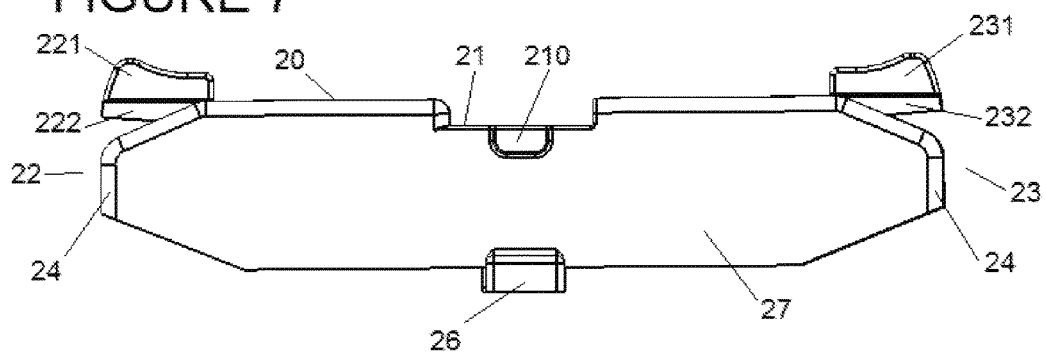
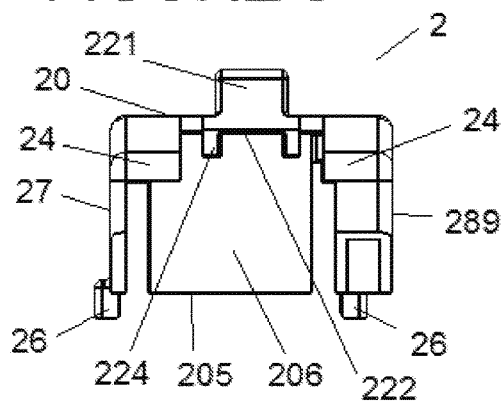
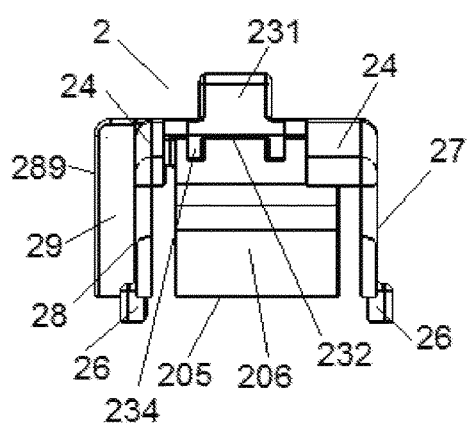

WINDSHIELD WIPER CONNECTOR

CROSS REFERENCE TO RELATED APPLICATIONS

This application claims the benefit of U.S. Provisional Application No. 62/339,072 filed May 19, 2016, the disclosure of which is hereby incorporated herein by reference in its entirety.

TECHNICAL FIELD

This invention relates in general to windshield wipers, and more particularly, to an improved connector for a windshield wiper that allows the windshield wiper to be attached to a top-lock windshield wiper arm. The invention is also directed to windshield wipers incorporating these novel connectors.

BACKGROUND OF THE DISCLOSURE

There are a variety of wiper arms on which wiper blades are provided as original equipment. These various wiper arms have hooks, pins, or other configurations which may connect to the wiper blade with or without connectors. These various configurations have created a problem in the replacement market because wiper blade providers are required to have multiple wiper blade configurations to accommodate all of the existing wiper arms. It is therefore advantageous to have attachment structures that can accommodate a host of arms to reduce the complexity and cost associated with this problem.

The need to attach replacement windshield wiper blades to multiple arms has been addressed to some degree. For example, windshield wiper blades have been designed to work with various hook-type wiper arms having different sizes. Connectors may also be configured to receive either a pin-type arm or a hook arm. While these connectors may increase the usefulness of a given windshield wiper such that it can be used with different wiper arm types, the connectors are often expensive and have a complicated structure that is difficult and time-consuming to manufacture Thus, there is a need for inexpensive connectors that are capable of securing a windshield wiper blade to a variety of arms. It would also be desirable to have a windshield wiper connector that can be fabricated or molded as a single piece at low-cost, and that can accommodate a variety of wiper arms. The disclosed concepts provide a low-cost windshield wiper connector capable of attachment to a variety of windshield wiper arms for the purpose of reducing the amounts of inventory parts required to supply a vehicle market that uses a wide variety of windshield wiper arm types.

SUMMARY OF THE DISCLOSURE

The following presents a simplified summary of the disclosure in order to provide a basic understanding of some aspects of the invention. This summary is not an extensive overview of every embodiment disclosed herein. It is intended to neither identify key or critical elements of the various embodiments nor delineate the scope of the disclosure. Its sole purpose is to present some concepts of the disclosure, in accordance with the various embodiments disclosed herein, in a simplified form as a prelude to the more detailed description that is presented later.

This disclosure is generally directed to novel connectors for windshield wiper blades. In certain embodiments, a connector assembly includes a base connector having two longitudinal side walls, a first and second end, and a top surface extending therebetween, wherein the top surface has a pair of cantilevered beams, each provided with a locking tab, extending from a central portion towards each respective end of the base connector. The locking tabs are capable of engaging and securing an aperture in cap or wiper arm. The base connector further has a central recessed portion capable of receiving and securing a top wall of a side adapter. The base connector may further include a base support structure capable of securing the base connector to a wiper blade. The disclosure is also directed to wiper blades incorporating the connector assemblies described herein.

BRIEF DESCRIPTION OF THE DRAWINGS

The following description and the annexed drawings set forth certain illustrative aspects of the embodiments of the disclosure. These aspects are indicative, however, of but a few of the various ways in which the principles of the disclosure may be employed and the various embodiments are intended to include all such aspects and their equivalents. Other advantages and novel features will become apparent from the following description when considered in conjunction with the drawings.

FIG. 2 top perspective view of the base connector shown in FIG. 1.

FIG. 3 is a bottom perspective view of the base connector shown in FIG. 1.

FIG. 4 is a top view of the base connector shown in FIG. 1.

FIG. 5 is a bottom view of the base connector shown in FIG. 1.

FIG. 6 is a side view of the base connector shown in FIG. 1.

FIG. 7 is an opposing side view of the base connector shown in FIG. 1.

FIG. 8 is a first end view of the base connector shown in FIG. 1.

FIG. 9 is a second end view of the base connector shown in FIG. 1.

DETAILED DESCRIPTION OF THE DISCLOSURE

Figure 1:
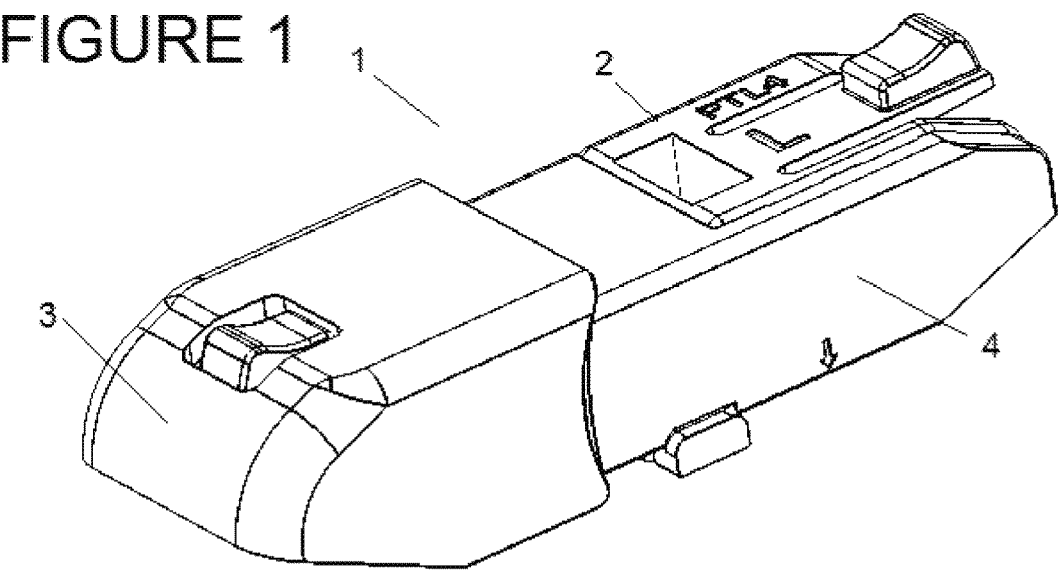
FIG. 1 is a top perspective view of an embodiment of a connector assembly including embodiments of a base connector, a covering cap, and a side adapter of the disclosure.

The following detailed description and the appended drawings describe and illustrate some embodiments of the disclosure for the purpose of enabling one of ordinary skill in the relevant art to make and use these embodiments. As such, the detailed description and illustration of these embodiments are purely illustrative in nature and are in no way intended to limit the scope of the disclosure in any manner. It should also be understood that the drawings are not necessarily to scale and in certain instances details may have been omitted, which are not necessary for an understanding of the embodiments, such as details of fabrication and assembly. In the accompanying drawings, like numerals represent like components.

In this document, the terms "a" or "an" are used, as is common in patent documents, to include one or more than one. In this document, the term "or" is used to refer to a nonexclusive or, unless otherwise indicated. Furthermore, references to "one embodiment" or "an embodiment" are not intended to be interpreted as explicitly excluding the existence of additional embodiments that also incorporate the recited features. Moreover, unless explicitly stated to the contrary, embodiments "comprising," "including," or "having" an element or a plurality of elements having a particular property may include additional such elements not having that property.

This disclosure is generally directed to novel connectors for windshield wiper blades. In certain embodiments, a connector assembly may have a base connector, having two longitudinal side walls, a first and second end, and a top surface extending therebetween. The top surface may have a pair of cantilevered beams, each provided with a locking tab, extending from a central portion towards each respective end of the base connector. The locking tabs may be capable of engaging and securing an aperture in cap or wiper arm. The base connector further may have a central recessed portion capable of receiving and securing a top wall of a side adapter. The base connector may further include a base support structure capable of securing the base connector to a wiper blade. The invention is also directed to wiper blades incorporating the connector assemblies described herein.

In certain embodiments, the side walls of the base connector may include rests which are capable of supporting a wiper arm when the connector assembly is secured to a wiper arm. In certain embodiments, the side walls may also have an extended portion such that the base connector has a greater width (i.e. distance between the side walls) at one end than at the other end. In certain embodiments, the base connector may further have wings along side at least one of the cantilevered beams, such that grooves are formed between the wings and the cantilevered beams.

In certain embodiments, the base connector may further have a bottom support structure that comprises internal side walls having arcuate rivet clips that are capable of securing the rivet of a mounting base of a wiper blade. In certain embodiments, the bottom support structure may further have transverse lateral walls which extend between and connect the internal side walls.

In certain embodiments, the base connector may further have a cavity provided with projections that are capable of engaging and securing recesses in flaps of a side adapter. In certain embodiments, the side walls may further have a bottom recesses that are capable of receiving and securing a bottom projection in a side adapter.

In certain embodiments, the connector assembly may further be provided with a side adapter having a top portion and a side wall. In certain embodiments, the top portion may be provided with flaps having recesses which are capable of engaging the projections in the cavity of the base connector. In certain embodiments, the side adapter may further have a side wall with a bottom projection which engages the bottom recess of the base connector. In certain embodiments, the side adapter may further have a rest which abuts the rest of at least one of the side walls of the base connector, and which is capable of supporting a wiper arm when the connector assembly connects to a wiper arm.

In certain embodiments, the connector assembly may also be provided with a cap having an aperture which can engage and secure one of the locking tabs of the base connector. In certain embodiments, the cap may further have channeling ribs which slidably engage the groove between the cantilevered beam and the wings on one of the ends of the base connector. In certain embodiments, the cap may further have claws which engage the bottom of the side walls of the base connector. In certain embodiments, the cap may further have spacers which maintain a gap between the cap and the ends of the wings or top surface of the base connector.

In certain embodiments, the connector may further include a cap having an aperture which can engage and secure at least one of the locking tabs of the base connector. In certain embodiments, the cap may further include channeling ribs which slidably engage the groove between the cantilevered beam and the wings on one of the ends of the base connector. In certain embodiments, the cap may further include claws which engage the bottom of the side walls of the base connector. In certain embodiments, the cap may further include spacers which maintain a gap between the cap and the ends of the wings or top surface of the base connector.

In certain embodiments, a wiper blade assembly may include a wiper strip, a force distribution structure, and a connector assembly. The connector assembly may include a base connector, having two longitudinal side walls, a first and second end, and a top surface extending therebetween. The top surface may include a pair of cantilevered beams, each provided with a locking tab, extending from a central portion of the top surface towards each respective end of the base connector. The locking tabs may be capable of engaging and securing an aperture in cap or wiper arm. A central recessed portion may be capable of receiving and securing a top wall of a side adapter, and a base support structure may be capable of securing the base connector to a wiper blade.

In certain embodiments the connector assembly may further include wings alongside at least one of the cantilevered beams, such that grooves are formed between the wings and the cantilevered beams. In certain embodiments, the base support structure may include internal side walls having arcuate rivet clips that are capable of securing the rivet of a mounting base of a wiper blade, and transverse lateral walls which extend between and connect the internal side walls. Certain embodiments may further include a side adapter having a top portion and a side wall; the top portion comprising flaps having recesses which are capable of engaging projections in a cavity of the base connector. In certain embodiments, the connector assembly may include a cap having an aperture which can engage and secure at least one of the locking tabs of the base connector.

Figure 15:
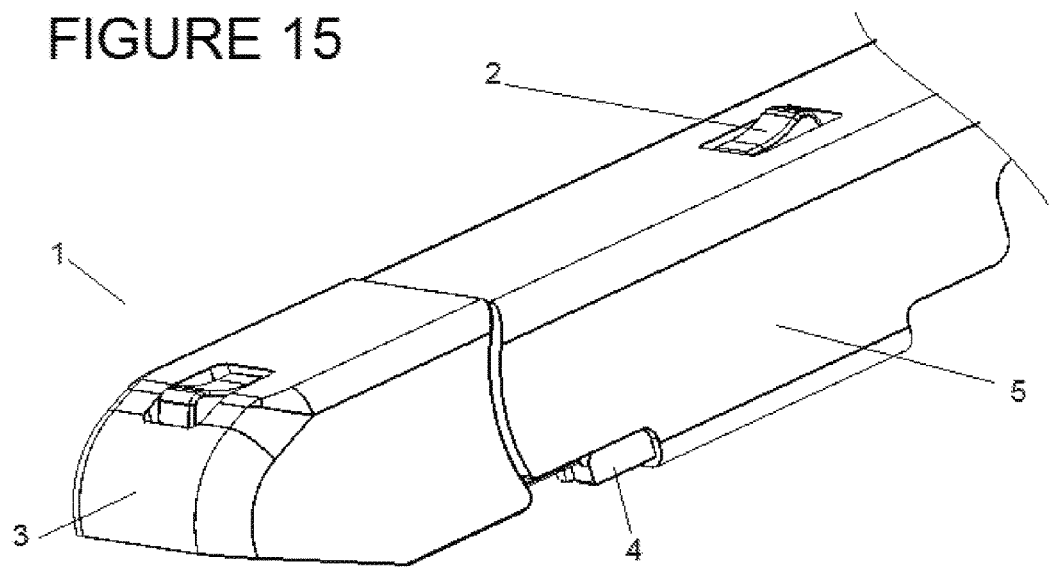
FIG. 15 is a top perspective view of the base connector, cap and side adapter connected to a wiper arm.
Figure 16:
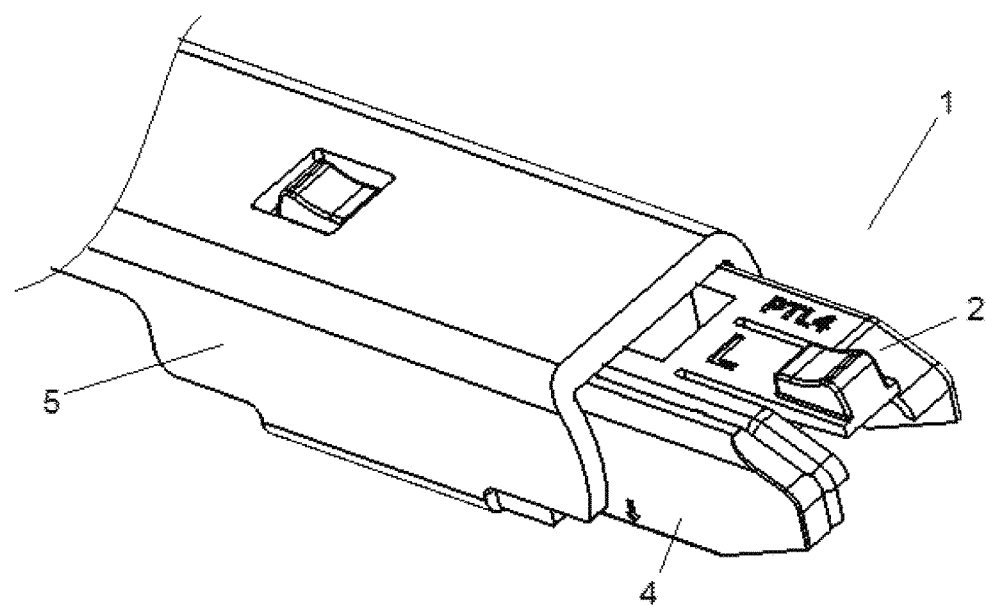
FIG. 16 is a top perspective view of the base connector, and side adapter shown in FIG. 1 connected to a wiper arm.
Figure 17:
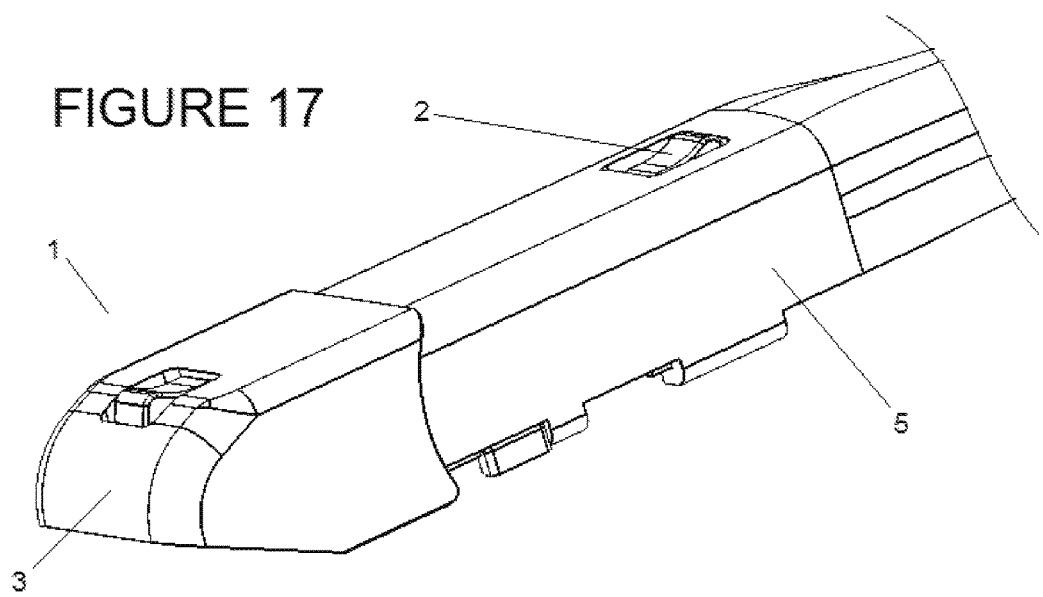
FIG. 17 is a top perspective view of the base connector and cap shown in FIG. 1 connected to a wiper arm.

FIG. 1 illustrates a top perspective view of an embodiment of a connector assembly 1 of the disclosure. The connector assembly 1 may be designed to connect to numerous types of top-lock wiper arms, as shown in FIGS. 15-17. The connector assembly 1 may have a base connector 2, a cap 3, and a side adapter 4.

FIGS. 2-9 illustrate various views of the base connector 2 of the connector assembly 1. The base connector 2 may have a first end 22 and a second end 23. The base connector may further have a first longitudinal side wall 27, and a second longitudinal side wall 28. One or both of the longitudinal side walls may have an extended first portion 289 which extends laterally outward from the respective side wall 28. A shelf 29 facing towards second end 23 may be provided between the extended first portion 289 and the side wall 28. Shelf 29 may be shaped to complement the shape of the end of a wiper arm 5, and the shape of the side adapter 4. The side walls 27, 28 may further be provided with rests 26, which receive and support the bottom of a wiper arm 5 and/or a side adapter 4. The side walls 28 may further be provided with bottom recess 280 which receives and secures a bottom projection 480 in the wall 48 of the side adapter 4.

A top surface 20 may extend between opposing peripheral side walls 27, 28. The top surface may be provided with a pair of cantilevered beams 222, 232. The cantilevered beams may extend from the center portion of the base connector 2 towards respective first and second ends 22, 23. Each cantilevered beam 222, 232 may further be provided with a locking tab 221, 231. The locking tabs may engage apertures 31, in either the cap 3 or in a top-lock wiper arm 5, to secure the base connector 2 to same. As shown in FIG. 5, the bottom of the cantilevered beams 222, 232 may further be provided with hollowed recesses 223, 233 underneath the locking tabs 221, 231. The cantilevered beams 222, 232 may extend between wings 24 on either ends 22, 23 of the base connector 2. The cantilevered beams 222, 232 may be separated from the wings 24 by grooves. The bottom of the cantilevered beams 222,232 may further be provided with reinforcing ribs 224, 234. Top recesses 200 may be provided in the top surface 20 of the base connector 2. These top recesses 200 may be sized and shaped to receive a tongue (not shown) extending from a top-lock wiper arm.

The top surface 20 may further be provided with a central recessed portion 21 which may be sized and shaped to accommodate side adapter 4. The central recessed portion 21 may further be provided with a cavity 211 having projections 212. The cavity 211 may receive and secure flaps 42 by having the projections 212 engage securing recesses 41 in the flaps 42. The projections 212 and securing recesses 41 may have complementary shapes that engage and secure one another. Persons of skill in the art will recognize that the projections and recesses may be swapped such that the projections are on the flaps 42 of the side adapter 4, and the recesses are in the walls of the cavity 211. Any other suitable method of securing the top wall 40 of the side adapter 4 to the central recessed portion 21 of the base connector 2 may also be practiced within the disclosed concepts. The central recess portion 21 may also be provided with notch 210 to facilitate the separation of the base connector 2 from the side adapter 4 via the use of a tool, or a person's finger nail.

Figure 10:
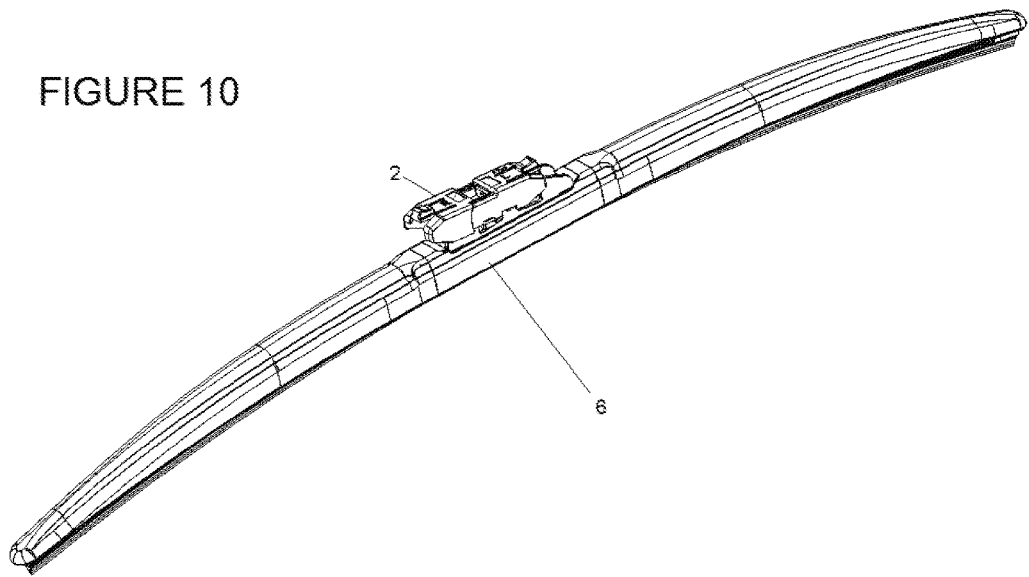
FIG. 10 is a top perspective view of the connector shown in FIG. 1 attached to a windshield wiper blade.

As shown in FIG. 10, the base connector 2 may be mounted on and secured to the mounting base of a wiper blade 6 via the rivet clips 201, 202, or via any other known method of pivotally securing a connector to a wiper blade known in the art. The base connector 2 can be used to connect a wiper arm alone, or with the cap 3, and/or the side adapter 4. In certain embodiments, the connector assembly 1 or base connector 2 may be connected to the wiper blade 6 prior to connecting to the wiper arm 5. In certain embodiments, the connector assembly 1 or base connector 2 may be connected to the wiper arm 5 prior to being connected to the wiper blade 6. In certain embodiments, the connector assembly 1 may either be first connected to the wiper blade 6 or to the wiper arm 5. The wiper blade 6 may be a traditional wiper blade having a plurality of tournament-style brackets. Alternatively the wiper blade 6 may be a beam blade, such that the force from the wiper arm 5 is distributed along the wiper blade 6 by one or more spring-elastic beams. Alternatively, the wiper blade 6 may be a hybrid blade comprising one or more spring elastic beams, and one or more brackets. Persons of ordinary skill in the art will recognize that the disclosed concepts may be practiced with any wiper blade known in the art.

Figure 11:
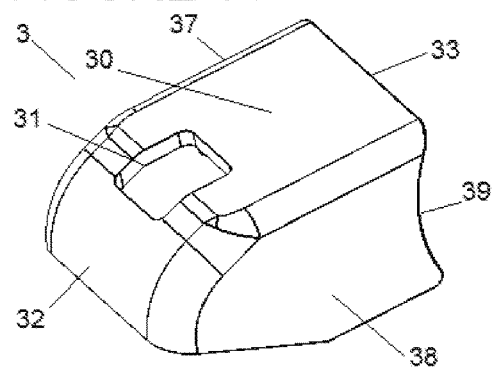
FIG. 11 is a top perspective view of a cap for the base connector shown in FIG. 1.
Figure 12:
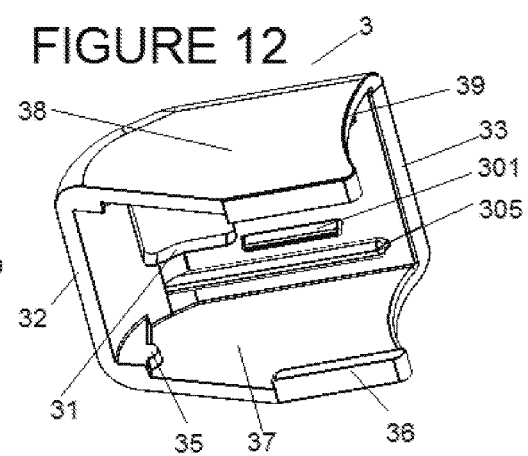
FIG. 12 is a bottom perspective view of a cap for the base connector shown in FIG. 1.

FIGS. 11 and 12 illustrate a cap 3 in accordance with the disclosed concepts. The cap 3 may have a top surface 30, a first end 32 and a second end 33, side walls 37, 38, and a contoured back edge 39. The side walls 37, 38 are preferably sized and shaped to receive the first or second ends 22, 23 of the base connector. A connector assembly 1 may be provided with a cap 3 for each end. The contoured edge 39 may be provided with a shape that is complementary to the shelf 29 of the base connector 2, and may be located adjacent to same when the cap 3 is engaged with and secured to the base connector 2.

The cap 3 may further be provided with an aperture 31, spacers, 305, 35, bottom claws 36, and channeling ribs 301. The aperture 31 may receive and secure the locking tabs 221, 231 of the base connector. The claws 36 may support and secure the bottoms of the longitudinal side walls 27, 28, 289 when the cap 3 is engaged with and secured to the base connector 2. The channeling ribs 301 may be sized to enter and slidably engage the grooves between the cantilevered beams 222, 232 and the wings 24. The spacers 35, 305 may be sized to leave a margin between the ends of the wings 24 and/or the top surface 20 of the base connector 2.

Figure 13:
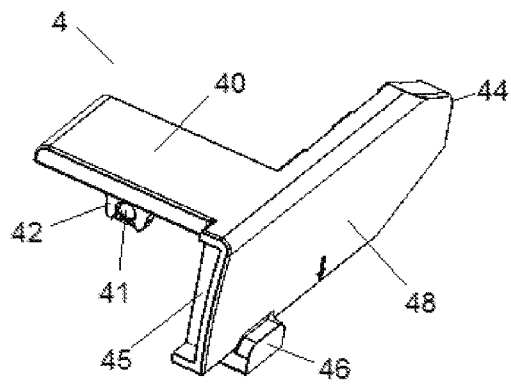
FIG. 13 is a top perspective view of the side adapter shown in FIG. 1.
Figure 14:
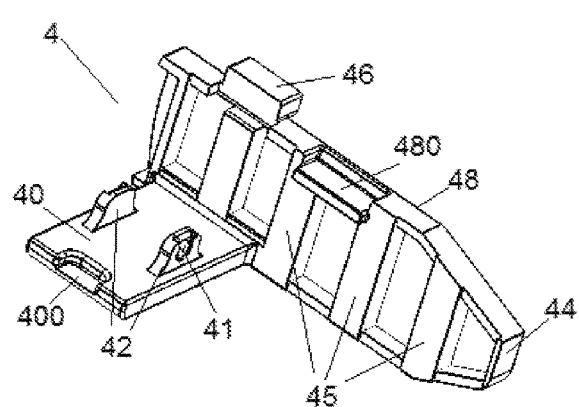
FIG. 14 is a bottom perspective view of the side adapter shown in FIG. 1.

FIGS. 13 and 14 illustrate the side adapter 4 in accordance with the disclosed concepts. The side adapter may have a top wall, a side wall 48 a rest 46 and an end wing 44. The side wall 48 may be provided with internal ribs 45 for structural strength and support, and with an internal projection 480 which may engage bottom recess 280 in a side wall 28 of the base connector 2. One or more rests 46 may be provided on the bottom of side wall 48, and these rests may correspond to, and be disposed adjacent to the rests 26 in the side walls 27, 28 of the base connector 2 when the side adapter 4 is connected to the base connector 2.

The side adapter has a top wall 40 having flaps 42 with securing recesses 41. As discussed above, the securing recesses 41 may be sized and shaped to receive and secure projections 212 in the cavity 211 of the base connector 2. The projections and securing recesses may be swapped between the cap 3 and the base connector 2, and any other known method for securing the adapter to the base connector known in the art may be used in accordance with the disclosed concepts. The side adapter 4 may further be provided with a notch 400 that may align with the notch 210 in the recessed central portion 21 of the base connector. The notches may facilitate separation of the side adapter 4 from the base connector 2 via the use of a tool, or a person's fingernail.

FIGS. 15-17 illustrate different wiper arms connecting to the connector assembly in different configurations. In FIG. 15, the base connector 2, cap 3, side adapter 4 are all used to connect to the wiper arm 5, such that the wiper arm 5 is supported by the rests 26, 46 of the base connector 2 and side adapter 4, and the locking tab 231 of the second end 23 of the base connector 2 engages and secures an aperture in the wiper arm. FIG. 16 shows a similar, but reversed, arrangement where the wiper arm 5 engages the locking tab 221 of the first end 22 of the base connector 2, and the second end 23 of the base connector and wing 44 of the side adapter 4 can be seen. A cap 3 may be provided that can cover and secure the end of the connector assembly 1 in this configuration. FIG. 17 shows the connector assembly 1 connecting to a narrower wiper arm 5 using only the base connector 2 and the cap 3 of the disclosed concepts. The side adapter 4 is removed from the connector assembly in the embodiment depicted in FIG. 17. Similarly, FIGS. 15, 16, and 17 illustrate that the rests 26, 46 in the base connector 2 and/or side adapter 4 may serve as stops which abut claws on the wiper arm 5 to properly position the connector assembly relative to the wiper arm 5. Persons of skill in the art will recognize that the disclosed concepts can be implemented in a variety of different ways to connect to top-lock wiper arms of different shapes and sizes.

Those skilled in the art will recognize that while the invention will most likely be used in conjunction with automobiles, it is suitable for use with any vehicle. For example, in addition to automobiles, trucks, buses, locomotives, aircrafts, or any other vehicle type that uses a windshield wiper can benefit from the invention.

While specific embodiments have been discussed to illustrate the invention, it will be understood by those skilled in the art that the descriptions herein are intended as illustrative, and not as limiting, and that variations in the embodiments can be made without departing from the spirit of the invention.

For example, any suitable material can be used to manufacture the connector. The number or position of the locking tabs, guide pins, or other mechanisms can vary so long as they are capable of performing their intended function.

The descriptions set forth above are meant to be illustrative and not limiting. Various modifications of the embodiments, in addition to those described herein, will be apparent to those skilled in the art from the foregoing description. Such modifications are also intended to fall within the scope of the concepts described herein. Each patent, patent application and publication cited or described in this document are hereby incorporated herein by reference, in their entireties.

The foregoing description of possible implementations consistent with the present disclosure does not represent a comprehensive list of all such implementations or all variations of the implementations described. The description of some implementation should not be construed as an intent to exclude other implementations. For example, artisans will understand how to implement the embodiments in many other ways, using equivalents and alternatives that do not depart from the scope of the disclosure. Moreover, unless indicated to the contrary in the preceding description, none of the components described in the implementations are essential to the embodiments disclosed. It is thus intended that the embodiments be considered as illustrative, with a true scope and spirit of the disclosure being indicated by the following claims.

I claim:

1. A connector assembly comprising:
  a base connector, having two longitudinal side walls;
  a first and second end, and a
  top surface extending therebetween; wherein the top surface comprises a pair of cantilevered beams, each provided with a locking tab, extending from a central portion of the top surface towards each respective end of the base connector; wherein the locking tabs are capable of engaging and securing an aperture in a cap or a wiper arm;
  a central recessed portion capable of receiving and securing a top wall of a side adapter;
  a base support structure capable of securing the base connector to a wiper blade;
  wings alongside at least one of the cantilevered beams, such that grooves are formed between the wings and said at least one of the cantilevered beams; and
  a cap having an aperture which can engage and secure at least one of the locking tabs of the base connector, wherein the cap further comprises channeling ribs which slidably engage the grooves between the at least one cantilevered beam and the wings on one of the ends of the base connector.

2. The connector assembly of claim 1 where in the side walls of the base connector further comprise rests which are capable of supporting a wiper arm when the connector assembly is secured to a wiper arm.

3. The connector assembly of claim 1 wherein the side walls further comprise an extended portion such that the base connector has a first width at one of the first and second ends that is greater than a second width at the other of the first and second ends, wherein the first width and second width are defined as the distance between the side walls at the respective first or second end.

4. The connector assembly of claim 1 wherein the base support structure comprises internal side walls having arcuate rivet clips that are capable of securing the rivet of a mounting base of a wiper blade.

5. The connector assembly of claim 4 wherein base support structure further comprises transverse lateral walls which extend between and connect the internal side walls.

6. The connector assembly of claim 1 wherein the base connector comprises a cavity provided with projections that are capable of engaging and securing recesses in flaps of a side adapter.

7. The connector assembly of claim 1 wherein the side walls further comprise a one or more bottom recesses that are capable of receiving and securing a bottom projection in a side adapter.

8. The connector assembly of claim 1 further comprising a side adapter having a top portion and a side wall; the top portion comprising flaps having recesses which are capable of engaging projections in a cavity of the base connector.

9. The connector assembly of claim 8 wherein the side adapter further comprises a side wall with a bottom projection which engages a bottom recess of the base connector.

10. The connector assembly of claim 8 wherein the side adapter further comprises a rest which abuts the rest of at least one of the side walls of the base connector, and which is capable of supporting a wiper arm when the connector assembly connects to the wiper arm.

11. The connector assembly of claim 1 wherein the cap further comprises claws which engage the bottom of the side walls of the base connector.

12. The connector assembly of claim 1 wherein the cap further comprises spacers which maintain a gap between the cap and the ends of the wings or top surface of the base connector.

13. A wiper blade assembly comprising
  a wiper strip;
  a force distribution structure; and
  a connector assembly comprising:
    a base connector, having two longitudinal side walls;
    a first and second end, and a
    top surface extending therebetween; wherein the top surface comprises a pair of cantilevered beams, each provided with a locking tab, extending from a central portion of the top surface towards each respective end of the base connector; wherein the locking tabs are capable of engaging and securing an aperture in a cap or a wiper arm;

a central recessed portion capable of receiving and securing a top wall of a side adapter;

a base support structure capable of securing the base connector to a wiper blade; and a side adapter having a top portion and a side wall; the top portion comprising flaps having recesses which are capable of engaging projections in a cavity of the base connector.

14. The wiper blade assembly of claim 13 wherein the connector assembly further comprises wings alongside at least one of the cantilevered beams, such that grooves are formed between the wings and the cantilevered beams.

15. The wiper blade assembly of claim 13 wherein the base support structure comprises internal side walls having arcuate rivet clips that are capable of securing the rivet of a mounting base of a wiper blade, and transverse lateral walls which extend between and connect the internal side walls.

16. The wiper blade assembly of claim 13 further comprising a cap for the connector assembly, the cap having an aperture which can engage and secure at least one of the locking tabs of the base connector.

17. The wiper blade assembly of claim 13 wherein the connector assembly further comprising a cap having an aperture which can engage and secure at least one of the locking tabs of the base connector.

18. The wiper blade assembly of claim 17 wherein the cap further comprises channeling ribs which slidably engage grooves between one of the cantilevered beams and wings on one of the ends of the base connector.

19. A wiper blade assembly comprising
a wiper strip;
a force distribution structure; and
a connector assembly comprising:
a base connector, having two longitudinal side walls;
a first and second end, and a
top surface extending therebetween; wherein the top surface comprises a pair of cantilevered beams, each provided with a locking tab, extending from a central portion of the top surface towards each respective end of the base connector; wherein the locking tabs are capable of engaging and securing an aperture in a cap or a wiper arm;
a central recessed portion capable of receiving and securing a top wall of a side adapter;
a base support structure capable of securing the base connector to a wiper blade; wings alongside at least one of the cantilevered beams, such that grooves are formed between the wings and said at least one of the cantilevered beams; and
a cap having an aperture which can engage and secure at least one of the locking tabs of the base connector, wherein the cap further comprises channeling ribs which slidably engage the grooves between the at least one cantilevered beam and the wings on one of the ends of the base connector.

* * * * *